(12) United States Patent
Pang et al.

(10) Patent No.: US 10,419,424 B2
(45) Date of Patent: Sep. 17, 2019

(54) METHOD AND DEVICE FOR ESTABLISHING CONNECTION

(71) Applicant: Huawei Device Co., Ltd., Dongguan (CN)

(72) Inventors: Gaokun Pang, Shenzhen (CN); Zhiming Ding, Shenzhen (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 265 days.

(21) Appl. No.: 14/953,828

(22) Filed: Nov. 30, 2015

(65) Prior Publication Data

US 2016/0087967 A1 Mar. 24, 2016

Related U.S. Application Data

(63) Continuation of application No. PCT/CN2014/079074, filed on Jun. 3, 2014.

(30) Foreign Application Priority Data

May 31, 2013 (CN) .......................... 2013 1 0213744

(51) Int. Cl.
*H04L 29/06* (2006.01)
*H04W 76/10* (2018.01)
(Continued)

(52) U.S. Cl.
CPC .......... *H04L 63/083* (2013.01); *H04L 63/065* (2013.01); *H04W 12/003* (2019.01);
(Continued)

(58) Field of Classification Search
None
See application file for complete search history.

(56) References Cited

U.S. PATENT DOCUMENTS 9,100,942 B2 * 8/2015 Ramasamy ........... H04W 76/14
9,179,296 B2 * 11/2015 Jabara ................. H04L 63/0876
(Continued)

FOREIGN PATENT DOCUMENTS

CN 102185839 A 9/2011
CN 102378397 A 3/2012
(Continued)

OTHER PUBLICATIONS

Asokan et al., Mobile Platform Security, IEEE 2013, p. 108 (Year: 2013).*

(Continued)

*Primary Examiner* — Jeffrey C Pwu
*Assistant Examiner* — Baotram Tran
(74) *Attorney, Agent, or Firm* — Conley Rose, P.C.

(57) ABSTRACT

A method and a device for establishing a connection. The method includes the steps of: obtaining, by a group member device of a wireless device group, information about a to-be-connected device and then sending the information to a group owner device of the wireless device group, and/or transmitting, by the group member device, information about the group owner device to the to-be-connected device, where the information about the to-be-connected device and/or the information about the group owner device is used by the to-be-connected device and the group owner device to discover each other; and enabling, by the group member device, the to-be-connected device and the group owner device to share a first password, wherein the first password is used by the to-be-connected device and the group owner device to establish a connection after the to-be-connected device and the group owner device discover each other.

19 Claims, 8 Drawing Sheets

(51) Int. Cl.
*H04W 76/11* (2018.01)
*H04W 12/00* (2009.01)
*H04W 84/18* (2009.01)
*H04W 12/06* (2009.01)
*H04W 8/18* (2009.01)
*H04W 8/00* (2009.01)

(52) U.S. Cl.
CPC ............ *H04W 76/10* (2018.02); *H04W 76/11* (2018.02); *H04W 8/005* (2013.01); *H04W 8/186* (2013.01); *H04W 12/06* (2013.01); *H04W 84/18* (2013.01)

(56) References Cited

U.S. PATENT DOCUMENTS

| | | | | |
|---|---|---|---|---|
| 9,294,545 | B2* | 3/2016 | Desai | H04L 67/1093 |
| 9,357,094 | B2* | 5/2016 | Park | G06F 3/1296 |
| 9,380,401 | B1* | 6/2016 | Lambert | H04W 4/80 |
| 9,380,518 | B2* | 6/2016 | Jung | H04W 48/16 |
| 9,516,452 | B2* | 12/2016 | Bandyopadhyay | H04L 63/0428 |
| 9,578,494 | B2* | 2/2017 | Choi | H04W 76/10 |
| 2002/0087887 | A1* | 7/2002 | Busam | H04L 63/083 |
| | | | | 726/3 |
| 2008/0175187 | A1* | 7/2008 | Lowry | H04W 48/14 |
| | | | | 370/328 |
| 2011/0034127 | A1* | 2/2011 | Wentink | H04W 76/12 |
| | | | | 455/41.2 |
| 2011/0078445 | A1* | 3/2011 | Xiao | H04L 63/105 |
| | | | | 713/171 |
| 2011/0081860 | A1* | 4/2011 | Brown | H04N 1/00347 |
| | | | | 455/41.3 |
| 2011/0082940 | A1* | 4/2011 | Montemurro | H04L 69/24 |
| | | | | 709/227 |
| 2011/0260860 | A1* | 10/2011 | Gupta | G06Q 30/02 |
| | | | | 340/539.13 |
| 2012/0054493 | A1* | 3/2012 | Bradley | H04W 8/005 |
| | | | | 713/171 |
| 2012/0100861 | A1* | 4/2012 | Zhang | H04W 24/00 |
| | | | | 455/444 |
| 2012/0202185 | A1* | 8/2012 | Jabara | G09B 5/00 |
| | | | | 434/350 |
| 2012/0243685 | A1 | 9/2012 | Tanaka et al. | |
| 2012/0320401 | A1 | 12/2012 | Shibata | |
| 2012/0329555 | A1* | 12/2012 | Jabara | G07F 17/3218 |
| | | | | 463/29 |
| 2013/0007231 | A1* | 1/2013 | Forssell | H04L 41/082 |
| | | | | 709/221 |
| 2013/0036231 | A1* | 2/2013 | Suumaki | H04W 12/04 |
| | | | | 709/228 |
| 2013/0050259 | A1* | 2/2013 | Ahn | G06F 3/1454 |
| | | | | 345/633 |
| 2013/0057908 | A1 | 3/2013 | Park | |
| 2013/0064175 | A1* | 3/2013 | Pandey | H04W 8/005 |
| | | | | 370/328 |
| 2013/0134212 | A1* | 5/2013 | Chang | G06F 11/0742 |
| | | | | 235/375 |
| 2013/0148545 | A1* | 6/2013 | Jung | H04W 48/16 |
| | | | | 370/255 |
| 2013/0223361 | A1* | 8/2013 | Park | H04W 12/04 |
| | | | | 370/329 |
| 2013/0331141 | A1* | 12/2013 | Montemurro | H04W 48/18 |
| | | | | 455/515 |
| 2013/0333016 | A1* | 12/2013 | Coughlin | H04W 12/06 |
| | | | | 726/9 |
| 2013/0336161 | A1* | 12/2013 | Jung | H04W 76/14 |
| | | | | 370/254 |
| 2014/0018105 | A1* | 1/2014 | O'Neil | H04W 4/80 |
| | | | | 455/456.3 |
| 2014/0067675 | A1* | 3/2014 | Leyva | G06Q 20/40 |
| | | | | 705/44 |
| 2014/0106733 | A1* | 4/2014 | Wei | H04W 8/24 |
| | | | | 455/418 |
| 2014/0258723 | A1* | 9/2014 | Zhang | H04L 63/08 |
| | | | | 713/168 |
| 2016/0050566 | A1 | 2/2016 | Li et al. | |

FOREIGN PATENT DOCUMENTS

| | | |
|---|---|---|
| CN | 102474890 A | 5/2012 |
| CN | 102550061 A | 7/2012 |
| CN | 102687580 A | 9/2012 |
| CN | 102833752 A | 12/2012 |
| CN | 102984197 A | 3/2013 |
| CN | 104010297 A | 8/2014 |
| CN | 104349319 A | 2/2015 |
| EP | 2661112 A1 | 11/2013 |
| EP | 2993933 A1 | 3/2016 |
| WO | 2013048645 A1 | 4/2013 |
| WO | 2014176743 A1 | 11/2014 |

OTHER PUBLICATIONS

Berghel et al., WiFi Attack Vectors, ACM 2005, 8 pages (Year: 2005).*
Chow et al, The Death of the Internet: Solutions to the Problem, ACM 2012, 85 pages (Year: 2012).*
Deshpande et al., Predictive Methods for Improved Vehicular WiFi Acess, ACM 2009, 14 pages (Year: 2009).*
Georgopoulos et al., Providing Secure and Accountable Privacy to Roaming 802.11 Mobile Devices, ACM 2012, 6 pages (Year: 2012).*
Foreign Communication From a Counterpart Application, European Application No. 14804581.8, European Partial Supplementary European Search Report dated Apr. 7, 2016, 6 pages.
Machine Translation and Abstract of Chinese Publication No. CN102378397, Mar. 14, 2012, 7 pages.
Machine Translation and Abstract of Chinese Publication No. CN102185839, Sep. 14, 2011, 4 pages.
Foreign Communication From a Counterpart Application, Chinese Application No. 201310213744.7, Chinese Office Action dated May 18, 2017, 12 pages.
"Bluetooth User Interface Flow Diagrams for Bluetooth Secure Simple Pairing Devices," Usability Expert Group, Revision V1.0, XP002668327, Sep. 13, 2007, 54 pages.
Foreign Communication From a Counterpart Application, European Application No_ 14804581.8, Extended European Search Report dated Jul. 29, 2016, 14 pages.
Partial English Translation and Abstract of Chinese Patent Application No. CN104349319, Apr. 5, 2016, 14 pages.
"Wi-Fi Peer-to-Peer (P2P)," Technical Specification, Version 1.4, 2014, 183 pages.
"Wi-Fi Simple Configuration," Technical Specification, Version 2.0.2.1, 2011, 155 pages.
Foreign Communication From a Counterpart Application, PCT Application No. PCT/CN2014/079074, English Translation of International Search Report dated Sep. 15, 2014, 2 pages.
Foreign Communication From a Counterpart Application, PCT Application No. PCT/CN2014/079074, English Translation of Written Opinion dated Sep. 16, 2014, 5 pages.
Foreign Communication From a Counterpart Application, European Application No. 14804581.8, European Office Action dated Dec. 5, 2018, 6 pages.

* cited by examiner

A to-be-connected device sends information about the to-be-connected device to a group owner device of a wireless device group by using a group member device of the wireless device group, and/or the to-be-connected device obtains information about the group owner device by using the group member device, where the information about the to-be-connected device and/or the information about the group owner device is used by the to-be-connected device and the group owner device to discover each other ⟶ 810

The to-be-connected device shares a first password with the group owner device by using the group member device, where the first password is used by the to-be-connected device and the group owner device to establish a connection after the to-be-connected device and the group owner device discover each other ⟶ 820

FIG. 8

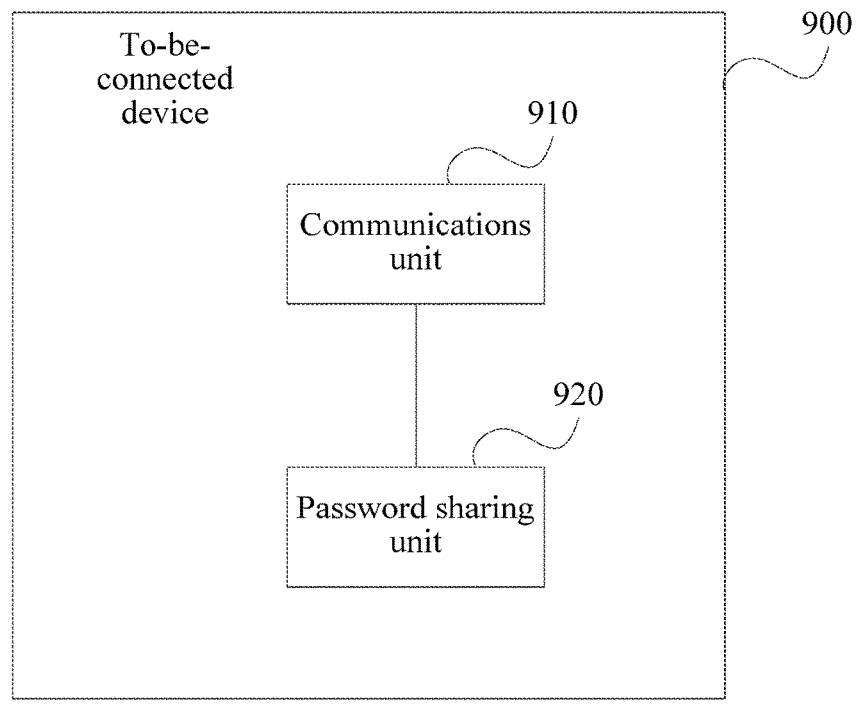

FIG. 9

METHOD AND DEVICE FOR ESTABLISHING CONNECTION

CROSS-REFERENCE TO RELATED APPLICATIONS

This application is a continuation of International Application No. PCT/CN2014/079074, filed on Jun. 3, 2014, which claims priority to Chinese Patent Application No. 201310213744.7, filed on May 31, 2013, both of which are hereby incorporated by reference in their entireties.

TECHNICAL FIELD

The present disclosure relates to the field of communications technologies, and in particular, to a method and a device for establishing a connection.

BACKGROUND

Currently, with the development of communications technologies, Wireless Fidelity (WiFi) functions become increasingly popular. WiFi peer to peer (P2P) may also be referred to as WiFi direct, and is a discovery and connection protocol that belongs to social WiFi. With the use of a WiFi P2P technology, direct end-to-end discovery between friends or adjacent services can still be implemented by using a WiFi function in the absence of an infrastructure (a cellular network and a hotspot). In other words, WiFi P2P requires neither a real-time connection to a server, nor a communications infrastructure in any form; instead, a user directly implements end-to-end discovery and information interaction.

With the use of the WiFi P2P technology, discovery and connection between devices mainly include the following steps: a scanning and discovery process; a group owner (GO) negotiation process after discovery; a WiFi protected setup (WPS) authentication process; and association (a four-way handshake) and communication.

Devices scan for and discover each other by using WiFi. After the discovery, a wireless device group needs to be established for the devices. To establish the wireless device group, one device needs to act as a GO, so that a GO negotiation process is required. After the group owner is determined through negotiation, the group owner authenticates a device. After the authentication succeeds, the GO issues one credential to the device, so that the device joins the wireless device group and becomes a group member of the wireless device group. A process of issuing a credential is a process of WPS authentication.

Based on WiFi P2P, after the wireless device group is established for the devices, if a user wants to connect a new device of the user to the wireless device group, the user needs to first enable the new device to scan for and discover the GO by using WiFi, and then executes a process of WPS authentication with the GO. After the authentication is completed, the new device joins the wireless device group. However, in an established wireless device group, in addition to a GO, there are many devices that have been associated with the GO. To join the wireless device group, the new device needs to scan for and discover the GO, and then executes a process of WPS authentication. During scanning and discovery, the user needs to confirm which device is the GO and often needs to approach the GO to perform an operation. However, in many cases, the GO is unreachable by the user (for example, it is inconvenient for the user to approach the GO), or the user has no idea which specific device is the GO, so the user needs to make multiple attempts. Therefore, in the prior art, when a user connects a new device to an established wireless device group, an operating procedure is complex, and efficiency is low.

SUMMARY

Embodiments of the present disclosure provide a method and a device for establishing a connection, to simplify an operating procedure of connecting a new device to an established wireless device group, thereby improving connection efficiency.

To resolve the foregoing technical problem, the embodiments of the present disclosure disclose the following technical solutions.

According to a first aspect, a method for establishing a connection is provided, where the method includes obtaining, by a group member device of a wireless device group, information about a to-be-connected device and then sending the information about the to-be-connected device to a group owner device of the wireless device group, and/or transmitting, by the group member device, information about the group owner device to the to-be-connected device, and enabling, by the group member device, the to-be-connected device and the group owner device to share a first password, where the first password is used by the to-be-connected device and the group owner device to establish a connection after the to-be-connected device and the group owner device discover each other.

With reference to the first aspect, in a first possible implementation manner of the first aspect, the method further includes establishing, by the group member device in a short-distance communication manner, a communication connection to the to-be-connected device; and based on the communication connection, obtaining, by the group member device, the information about the to-be-connected device and then sending the information about the to-be-connected device to the group owner device, and/or transmitting the information about the group owner device to the to-be-connected device.

With reference to the first possible implementation manner of the first aspect, in a second possible implementation manner of the first aspect, the enabling, by the group member device, the to-be-connected device and the group owner device to share a first password includes, based on the communication connection, obtaining, by the group member device, a password of the to-be-connected device as the first password, and sending the first password to the group owner device, or, based on the communication connection, using, by the group member device, a password shared by the group member device and the group owner device as the first password, where the password shared by the group member device and the group owner device is a password generated by the group member device and then sent to the group owner device, or, is a password generated by the group owner device and then sent to the group member device, and sending the first password to the to-be-connected device, or, based on the communication connection, performing, by the group member device, authentication configuration on the to-be-connected device, where authentication configuration is a process of WPS authentication configuration, after WPS authentication configuration succeeds, sending credential information to the to-be-connected device, where the credential information includes the first password, and sending the first password to the group owner device.

With reference to the first aspect, in a third possible implementation manner of the first aspect, the obtaining, by a group member device of a wireless device group, information about a to-be-connected device includes obtaining, by the group member device of the wireless device group, the information about the to-be-connected device by scanning a dynamic two-dimensional code pre-generated by the to-be-connected device.

With reference to the first aspect the third possible implementation manner of the first aspect, in a fourth possible implementation manner of the first aspect, the enabling, by the group member device, the to-be-connected device and the group owner device to share a first password includes obtaining, by the group member device, a dynamic password of the to-be-connected device by scanning the dynamic two-dimensional code pre-generated by the to-be-connected device, and sending the dynamic password as the first password to the group owner device, or, obtaining, by the group member device, a dynamic password of the to-be-connected device by scanning the dynamic two-dimensional code pre-generated by the to-be-connected device, executing, based on the dynamic password, a process of authentication configuration on the to-be-connected device, after authentication configuration succeeds, sending credential information to the to-be-connected device, where the credential information includes the first password, and sending the first password to the group owner device.

An implementation process of the authentication configuration is, if the dynamic password is a symmetric key, the group member device executes a configuration process in an existing WPS standard on the to-be-connected device, and sends credential information to the to-be-connected device, where the credential information includes the first password, or, the group member device newly generates a password through encryption of the dynamic password and then sends an encryption result to the to-be-connected device, and the password is used as the first password, or, the to-be-connected device newly generates a password through encryption of the dynamic password and then sends an encryption result to the group member device, and the password is used as the first password; if the dynamic password is a public key of an asymmetric key, the group member device encrypts a password by using the public key and sends the encrypted password to the to-be-connected device, the password is used as the first password, and the to-be-connected device obtains the password through decryption by using a private key corresponding to the public key, or, the group member device sends a public key of the group member device to the to-be-connected device, the group member device retains a private key of the group member device, the group member device obtains a shared key through calculation by using a public key of the to-be-connected device and the private key of the group member device and using the shared key as the first password, or uses a derivative key generated based on the shared key as the first password, and the to-be-connected device obtains the shared key through calculation by using the received public key of the group member device and a private key of the to-be-connected device and uses the shared key as the first password, or uses the derivative key generated based on the shared key as the first password.

With reference to the first aspect, in a fifth possible implementation manner of the first aspect, the group member device pre-generates a dynamic two-dimensional code to be scanned by the to-be-connected device, where the dynamic two-dimensional code includes the information about the group owner device.

With reference to the first aspect, or, with reference to the fifth possible implementation manner of the first aspect, in a sixth possible implementation manner of the first aspect, the enabling, by the group member device, the to-be-connected device and the group owner device to share a first password includes pre-generating, by the group member device, the dynamic two-dimensional code to be scanned by the to-be-connected device, where the dynamic two-dimensional code includes a dynamic password, and the dynamic password is a dynamic key generated by the group member device, and sending, by the group member device, the dynamic password as the first password to the group owner device, or, pre-generating, by the group member device, the dynamic two-dimensional code to be scanned by the to-be-connected device, where the dynamic two-dimensional code includes a dynamic password, executing, based on the dynamic password, a process of authentication configuration on the to-be-connected device, after authentication configuration succeeds, sending credential information to the to-be-connected device, where the credential information includes the first password, and sending the first password to the group owner device, or executing, based on the dynamic password, a process of authentication configuration on the to-be-connected device, after authentication configuration succeeds, sending, by the to-be-connected device, credential information to the group member device, where the credential information includes the first password, and sending the first password to the group owner device.

An implementation process of the authentication configuration is, if the dynamic password is a symmetric key, the group member device executes a configuration process in an existing WPS standard on the to-be-connected device, and sends credential information to the to-be-connected device, where the credential information includes the first password, or, the group member device newly generates a password through encryption of the dynamic password and then sends an encryption result to the to-be-connected device, and the password is used as the first password, or, the to-be-connected device newly generates a password through encryption of the dynamic password and then sends an encryption result to the group member device, and the password is used as the first password; if the dynamic password is a public key of an asymmetric key, the to-be-connected device encrypts a password by using the public key and sends the encrypted password to the group member device, the password is used as the first password, and the group member device obtains the password through decryption by using a private key corresponding to the public key, or, the to-be-connected device sends a public key of the to-be-connected device to the group member device, the to-be-connected device retains a private key of the to-be-connected device, the to-be-connected device obtains a shared key through calculation by using a public key of the group member device and the private key of the to-be-connected device and uses the shared key as the first password, or uses a derivative key generated based on the shared key as the first password, and the group member device obtains the shared key through calculation by using the received public key of the to-be-connected device and a private key of the group member device as the first password, or uses the derivative key generated based on the shared key as the first password, or, the group member device pre-generates a dynamic two-dimensional code to be scanned by the to-be-connected device, where a dynamic password included in the dynamic two-dimensional code is a password generated by the group owner device, and the dynamic password is used as the first password, or, the group member device pre-generates a dynamic two-dimensional code to be scanned by the to-be-connected device, where a dynamic password included in the dynamic two-dimensional code is a password generated by the group owner device, and the to-be-connected device and the group owner device perform authentication configuration based on the dynamic password, to obtain a shared key as the first password.

An implementation process of the authentication configuration is, if the dynamic password is a symmetric key, the group member device executes a configuration process in an existing WPS standard on the to-be-connected device, and sends credential information to the to-be-connected device, where the credential information includes the first password, or, the group owner device newly generates a password through encryption of the dynamic password and then sends an encryption result to the to-be-connected device, and the password is used as the first password, or, the to-be-connected device newly generates a password through encryption of the dynamic password and then sends an encryption result to the group owner device, and the password is used as the first password; if the dynamic password is a public key of an asymmetric key, the to-be-connected device encrypts a password by using the public key and sends the encrypted password to the group owner device, the password is used as the first password, and the group owner device obtains the password through decryption by using a private key corresponding to the public key, or, the to-be-connected device sends a public key of the to-be-connected device to the group owner device, the to-be-connected device retains a private key of the to-be-connected device, the to-be-connected device obtains a shared key through calculation by using a public key of the group owner device and the private key of the to-be-connected device and uses the shared key as the first password, or uses a derivative key generated based on the shared key as the first password, and the group owner device obtains the shared key through calculation by using the received public key of the to-be-connected device and a private key of the group owner device and uses the shared key as the first password, or uses the derivative key generated based on the shared key as the first password.

With reference to the first aspect, in a seventh possible implementation manner of the first aspect, the obtaining, by a group member device of a wireless device group, information about a to-be-connected device includes collecting, by the group member device of the wireless device group, a static two-dimensional code of the to-be-connected device, and obtaining the information about the to-be-connected device from the static two-dimensional code of the to-be-connected device.

With reference to the seventh possible implementation manner of the first aspect, in an eighth possible implementation manner of the first aspect, the enabling, by the group member device, the to-be-connected device and the group owner device to share a first password includes extracting, by the group member device, a password from the static two-dimensional code as the first password, and sending the first password to the group owner device, or, extracting, by the group member device, a password from the static two-dimensional code, executing, based on the password, a process of authentication configuration on the to-be-connected device, after authentication configuration succeeds, sending credential information to the to-be-connected device, where the credential information includes the first password, and sending the first password to the group owner device.

An implementation process of the authentication configuration is, if the password is a symmetric key, the group member device executes a configuration process in an existing WPS standard on the to-be-connected device, and sends credential information to the to-be-connected device, where the credential information includes the first password, or, the group member device newly generates a password through encryption of the password and then sends an encryption result to the to-be-connected device, and the password is used as the first password, or, the to-be-connected device newly generates a password through encryption of the password and then sends an encryption result to the group member device, and the password is used as the first password; if the password is a public key of an asymmetric key, the group owner device encrypts a password by using the public key and sends the encrypted password to the to-be-connected device, the password is used as the first password, and the to-be-connected device obtains the password through decryption by using a private key corresponding to the public key, or, the group member device sends a public key of the group member device to the to-be-connected device, the group member device retains a private key of the group member device, the group member device obtains a shared key through calculation by using a public key of the group member device and the private key of the group member device and uses the shared key as the first password, or uses a derivative key generated based on the shared key as the first password, and the to-be-connected device obtains the shared key through calculation by using the received public key of the group member device and a private key of the to-be-connected device and uses the shared key as the first password, or uses the derivative key generated based on the shared key as the first password.

With reference to the first aspect, in a ninth possible implementation manner of the first aspect, the obtaining, by a group member device of a wireless device group, information about a to-be-connected device and then sending the information about the to-be-connected device to a group owner device of the wireless device group, and/or transmitting, by the group member device, information about the group owner device to the to-be-connected device includes collecting, by the group member device of the wireless device group, a personal identification number (PIN) code of the to-be-connected device; scanning for and discovering, by the group member device, the to-be-connected device according to information about the PIN code; and after the group member device scans for and discovers the to-be-connected device, obtaining, by the group member device, the information about the to-be-connected device and sending the information about the to-be-connected device to the group owner device, and/or transmitting, by the group member device, the information about the group owner device to the to-be-connected device.

With reference to the ninth possible implementation manner of the first aspect, in a tenth possible implementation manner of the first aspect, the enabling, by the group member device, the to-be-connected device and the group owner device to share a first password includes extracting, by the group member device, a password from the PIN code as the first password, and sending the first password to the group owner device, or, extracting, by the group member device, a password from the PIN code, executing, based on the password, a process of WPS authentication configuration on the to-be-connected device, after WPS authentication configuration succeeds, sending credential information to the to-be-connected device, where the credential information includes the first password, and sending the first password to the group owner device.

With reference to the first aspect, in an eleventh possible implementation manner of the first aspect, the obtaining, by a group member device of a wireless device group, information about a to-be-connected device and then sending the information about the to-be-connected device to a group owner device of the wireless device group, and/or transmitting, by the group member device, information about the group owner device to the to-be-connected device includes collecting, by the to-be-connected device, a static two-dimensional code or a PIN code of the group member device; scanning for and discovering, by the to-be-connected device, the group member device based on the static two-dimensional code or the PIN code; and after the to-be-connected device scans for and discovers the group member device, obtaining, by the group member device, the information about the to-be-connected device and then sending the information about the to-be-connected device to the group owner device, and/or transmitting, by the group member device, the information about the group owner device to the to-be-connected device.

With reference to the eleventh possible implementation manner of the first aspect, in a twelfth possible implementation manner of the first aspect, the enabling, by the group member device, the to-be-connected device and the group owner device to share a first password includes using, by the group member device, a password in the static two-dimensional code or a password in the PIN code as the first password, and sending the first password to the group owner device, or, executing, based on the password in the static two-dimensional code or the password in the PIN code, a process of authentication configuration on the to-be-connected device, after authentication configuration succeeds, sending credential information to the to-be-connected device, where the credential information includes the first password, and sending the first password to the group owner device.

An implementation process of the authentication configuration may be, if the password is a symmetric key, the group member device executes a configuration process in an existing WPS standard on the to-be-connected device, and sends credential information to the to-be-connected device, where the credential information includes the first password, or, the group member device newly generates a password through encryption of the password and then sends an encryption result to the to-be-connected device, and the password is used as the first password, or, after the to-be-connected device newly generates a password through encryption of the password and then sends an encryption result to the group member device, and the password is used as the first password; if the password is a public key of an asymmetric key, the to-be-connected device encrypts a password by using the public key and sends the encrypted password to the group member device, the password is used as the first password, and the group member device obtains the password through decryption by using a private key corresponding to the public key, or, the to-be-connected device sends a public key of the to-be-connected device to the group member device, the to-be-connected device retains a private key of the to-be-connected device, the to-be-connected device obtains a shared key through calculation by using a public key of the group member device and the private key of the to-be-connected device and uses the shared key as the first password, or uses a derivative key generated based on the shared key as the first password, and the group member device obtains the shared key through calculation by using the received public key of the to-be-connected device and a private key of the group member device and uses the shared key as the first password, or uses the derivative key generated based on the shared key as the first password.

With reference to any one of the first to the twelfth possible implementation manners of the first aspect, in a thirteenth possible implementation manner of the first aspect, the first password is used as a password required by the to-be-connected device and the group owner device to execute a process of authentication configuration, or, the first password is used as a password required by the to-be-connected device and the group owner device to execute a process of handshake communication.

With reference to any one of the first to the thirteenth possible implementation manners of the first aspect, in a fourteenth possible implementation manner of the first aspect, the method further includes the following step: enabling, by at least one another group member device, the to-be-connected device and the group owner device to share a second password, where the first password and the second password are both used as passwords required by the to-be-connected device and the group owner device to execute a process of authentication configuration, or, the first password and the second password are both used as passwords required by the to-be-connected device and the group owner device to execute a process of handshake communication.

According to a second aspect, a method for establishing a connection is provided, where the method includes sending, by a to-be-connected device, information about the to-be-connected device to a group owner device of a wireless device group by using a group member device of the wireless device group, and/or obtaining, by the to-be-connected device, information about the group owner device by using the group member device, where the information about the to-be-connected device and/or the information about the group owner device is used by the to-be-connected device and the group owner device to discover each other; and sharing, by the to-be-connected device, a first password with the group owner device by using the group member device, where the first password is used by the to-be-connected device and the group owner device to establish a connection after the to-be-connected device and the group owner device discover each other.

With reference to the second aspect, in a first possible implementation manner of the second aspect, the method further includes establishing, by the to-be-connected device in a short-distance communication manner, a communication connection to the group member device; and based on the communication connection, sending, by the to-be-connected device, the information about the to-be-connected device to the group owner device by using the group member device, and/or obtaining, by the to-be-connected device, the information about the group owner device by using the group member device.

With reference to the first implementation manner of the second aspect, in a second possible implementation manner of the second aspect, the sharing, by the to-be-connected device, a first password with the group owner device by using the group member device includes, based on the communication connection, sending, by the to-be-connected device, a password of the to-be-connected device as the first password to the group owner device by using the group member device, or, based on the communication connection, receiving, by the to-be-connected device, a password shared by the group member device and the group owner device and sent by the group member device, and using the received password as the first password, or, based on the communication connection, executing, by the to-be-connected device, a process of authentication configuration on the group member device, and after authentication configuration succeeds, receiving credential information sent by the group member device, where the credential information includes the first password, where the first password is further sent by the group member device to the group owner device.

With reference to the first or the second implementation manner of the second aspect, in a third possible implementation manner of the second aspect, the method further includes the following step: sharing, by the to-be-connected device, a second password with the group owner device by using at least one another group member device, where the first password and the second password are both used as passwords required by the to-be-connected device and the group owner device to execute a process of authentication configuration, or, the first password and the second password are both used as passwords required by the to-be-connected device and the group owner device to execute a process of handshake communication.

According to a third aspect, a device for establishing a connection is provided, where the device includes an information transmission unit and a password sharing unit, where the information transmission unit is configured to obtain information about a to-be-connected device and then send the information about the to-be-connected device to a group owner device of the wireless device group, and/or transmit information about the group owner device to the to-be-connected device, where the information about the to-be-connected device and/or the information about the group owner device is used by the to-be-connected device and the group owner device to discover each other; and the password sharing unit is configured to enable the to-be-connected device and the group owner device to share a first password, where the first password is used by the to-be-connected device and the group owner device to establish a connection after the to-be-connected device and the group owner device discover each other.

With reference to the third aspect, in a first possible implementation manner of the third aspect, the information transmission unit is configured to establish, in a short-distance communication manner, a communication connection to the to-be-connected device, based on the communication connection, obtain the information about the to-be-connected device and then sends the information about the to-be-connected device to the group owner device, and/or transmit the information about the group owner device to the to-be-connected device.

With reference to the first implementation manner of the third aspect, in a second possible implementation manner of the third aspect, the password sharing unit is configured to, based on the communication connection, obtain a password of the to-be-connected device as the first password, and send the first password to the group owner device, or, based on the communication connection, use a password shared by the password sharing unit with the group owner device as the first password, and send the first password to the to-be-connected device, or, based on the communication connection, execute a process of authentication configuration on the to-be-connected device, after authentication configuration succeeds, send credential information to the to-be-connected device, where the credential information includes the first password, and send the first password to the group owner device.

With reference to the third aspect, in a third possible implementation manner of the third aspect, the information transmission unit is configured to obtain the information about the to-be-connected device by scanning a dynamic two-dimensional code pre-generated by the to-be-connected device.

With reference to the third implementation manner of the third aspect, in a fourth possible implementation manner of the third aspect, the information transmission unit is further configured to obtain a dynamic password of the to-be-connected device by scanning the dynamic two-dimensional code pre-generated by the to-be-connected device; and the password sharing unit is configured to send the dynamic password as the first password to the group owner device, or, execute, based on the dynamic password, a process of authentication configuration on the to-be-connected device, after authentication configuration succeeds, send credential information to the to-be-connected device, where the credential information includes the first password, and send the first password to the group owner device.

With reference to the third aspect, in a fifth possible implementation manner of the third aspect, the information transmission unit is configured to pre-generate a dynamic two-dimensional code to be scanned by the to-be-connected device, where the dynamic two-dimensional code includes the information about the group owner device.

With reference to the fifth implementation manner of the third aspect, in a sixth possible implementation manner of the third aspect, the dynamic two-dimensional code further includes a dynamic password; and the password sharing unit is configured to send the dynamic password as the first password to the group owner device, or, execute, based on the dynamic password, a process of authentication configuration on the to-be-connected device, after authentication configuration succeeds, send credential information to the to-be-connected device, where the credential information includes the first password, and send the first password to the group owner device.

With reference to the third aspect, in a seventh possible implementation manner of the third aspect, the information transmission unit is configured to collect a static two-dimensional code of the to-be-connected device, and obtain the information about the to-be-connected device from the static two-dimensional code of the to-be-connected device.

With reference to the seventh implementation manner of the third aspect, in an eighth possible implementation manner of the third aspect, the password sharing unit is configured to extract a password from the static two-dimensional code as the first password, and send the first password to the group owner device, or, extract a password from the static two-dimensional code, execute, based on the password, a process of authentication configuration on the to-be-connected device, after authentication configuration succeeds, send credential information to the to-be-connected device, where the credential information includes the first password, and send the first password to the group owner device.

With reference to the third aspect, in a ninth possible implementation manner of the third aspect, the information transmission unit is configured to collect a PIN code of the to-be-connected device, scan for and discover the to-be-connected device according to information about the PIN code, and after the information transmission unit scans for and discover the to-be-connected device, obtain the information about the to-be-connected device and then send the information about the to-be-connected device to the group owner device, and/or transmit the information about the group owner device to the to-be-connected device.

With reference to the ninth implementation manner of the third aspect, in a tenth possible implementation manner of the third aspect, the password sharing unit is configured to extract a password from the PIN code as the first password, and send the first password to the group owner device, or, execute, based on the password, a process of authentication configuration on the to-be-connected device, after authentication configuration succeeds, send credential information to the to-be-connected device, where the credential information includes the first password, and send the first password to the group owner device.

With reference to the third aspect, in an eleventh possible implementation manner of the third aspect, the information transmission unit is configured to enable the to-be-connected device to scan for and discover a proxy device by collecting, by the to-be-connected device, a static two-dimensional code or a PIN code of a proxy device, and after the to-be-connected device scans for and discovers the proxy device, obtain the information about the to-be-connected device and then send the information about the to-be-connected device to the group owner device, and/or transmit the information about the group owner device to the to-be-connected device.

With reference to the eleventh implementation manner of the third aspect, in a twelfth possible implementation manner of the third aspect, the password sharing unit is configured to use a password in the static two-dimensional code or the PIN code as the first password, and send the first password to the group owner device, or, execute, based on the password in the static two-dimensional code or the PIN code, a process of authentication configuration on the to-be-connected device, after authentication configuration succeeds, send credential information to the to-be-connected device, where the credential information includes the first password, and send the first password to the group owner device.

According to a fourth aspect, a device for establishing a connection is provided, where the device includes a communications unit and a password sharing unit, where the communications unit is configured to send information about a to-be-connected device to a group owner device of a wireless device group by using a group member device of the wireless device group, and/or obtain information about the group owner device by using the group member device, where the information about the to-be-connected device and/or the information about the group owner device is used by the to-be-connected device and the group owner device to discover each other; and the password sharing unit is configured to share a first password with the group owner device by using the group member device, where the first password is used by the to-be-connected device and the group owner device to establish a connection after the to-be-connected device and the group owner device discover each other.

With reference to the fourth aspect, in a first possible implementation manner of the fourth aspect, the communications unit is configured to establish, in a short-distance communication manner, a communication connection to the group member device, based on the communication connection, send information about the communications unit to the group owner device by using the group member device, and/or obtain the information about the group owner device by using the group member device.

With reference to the first implementation manner of the fourth aspect, in a second possible implementation manner of the fourth aspect, the password sharing unit is further configured to, based on the communication connection, send a password of the password sharing unit as the first password to the group owner device by using the group member device, or, based on the communication connection, receive a password shared by the group member device and the group owner device and sent by the group member device, and use the received password as the first password, or, based on the communication connection, execute a process of authentication configuration on the group member device, and after authentication configuration succeeds, receive credential information sent by the group member device, where the credential information includes the first password, where the first password is further sent by the group member device to the group owner device.

With reference to any one of the first and the second implementation manners of the fourth aspect, in a third possible implementation manner of the fourth aspect, the password sharing unit is further configured to share a second password with the group owner device by using at least one another group member device, where the first password and the second password are both used as passwords required by the to-be-connected device and the group owner device to execute a process of authentication configuration, or, the first password and the second password are both used as passwords required by the to-be-connected device and the group owner device to execute a process of handshake communication.

According to the method and the device for establishing a connection that are provided by the embodiments of the present disclosure, a group member device of a wireless device group obtains information about a to-be-connected device and then sends the information about the to-be-connected device to a group owner device of the wireless device group, and/or the group member device transmits information about the group owner device to the to-be-connected device, where the information about the to-be-connected device and/or the information about the group owner device is used by the to-be-connected device and the group owner device to discover each other, and the group member device enables the to-be-connected device and the group owner device to share a first password, where the first password is used by the to-be-connected device and the group owner device to establish a connection, so that the to-be-connected device and the group owner device more quickly complete a discovery and authentication process, which simplifies an operating procedure of connecting a new device to an established wireless device group, thereby improving connection efficiency.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show some embodiments of the present disclosure, and a person of ordinary skill in the art may still derive other drawings from these accompanying drawings without creative efforts.

FIG. 8 is a flowchart of a method for establishing a connection according to Embodiment 11 of the present disclosure;

FIG. 9 is a schematic structural diagram of modules of a device for establishing a connection according to Embodiment 12 of the present disclosure;

DETAILED DESCRIPTION

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

A two-dimensional code in the present disclosure may be dynamic or static, or may be a two-dimensional code in another form, and is determined as required.

Figure 1:
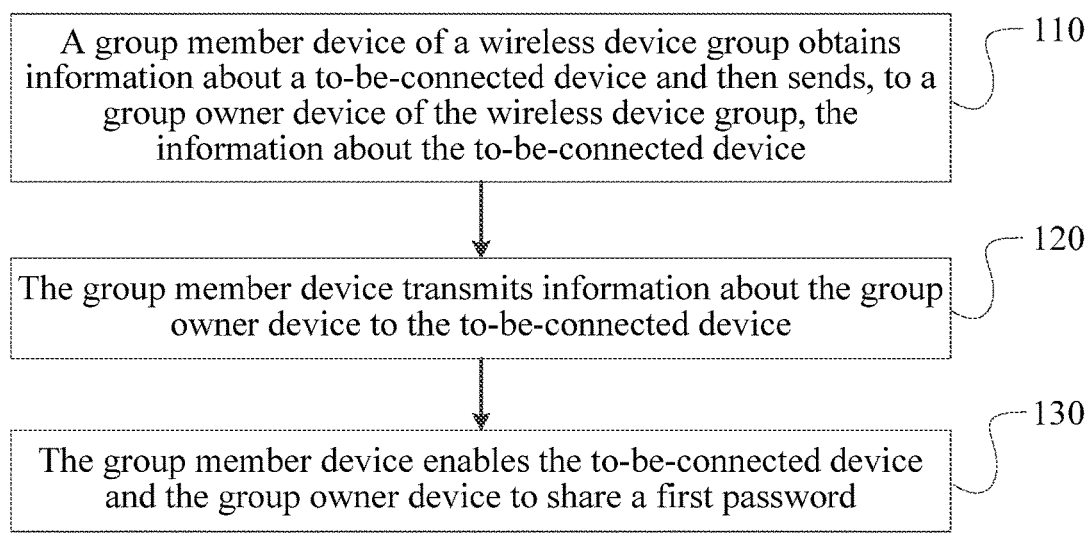
FIG. 1 is a flowchart of a method for establishing a connection according to the present disclosure.

FIG. 1 is a flowchart of a method for establishing a connection according to the present disclosure, and as shown in FIG. 1, the method includes the following steps.

110: A group member device of a wireless device group obtains information about a to-be-connected device and then sends the information about the to-be-connected device to a group owner device of the wireless device group.

The wireless device group includes the group owner device and the group member device, and may be a wireless local area network with a central node, such as a basic service set (BSS) network, a P2P network, or a smart grid.

The group owner device is a central node device of the wireless local area network, and may be an access point (AP) of a BSS network, or a GO of a P2P network. For a local network formed based on configuration, a group owner device is an AP with an external registrar, the AP and the external registrar are together referred to as the group owner device, and the external registrar completes an authentication function, or, the group owner device is an AP with a built-in registrar.

The group member device is a device that has established a connection to the group owner device.

120: The group member device transmits the information about the group owner device to the to-be-connected device.

130: The group member device enables the to-be-connected device and the group owner device to share a first password, where the first password is used by the to-be-connected device and the group owner device to establish a connection.

The information about the to-be-connected device and/or the information about the group owner device is used by the to-be-connected device and the group owner device to discover each other, and step 110 and step 120 are not necessarily both performed, but at least one of step 110 and step 120 is performed.

According to the method described in the present disclosure, a group member device that has established a connection to a group owner device in a wireless device group is used as a proxy device, to send information about a to-be-connected device to the group owner device, or, send information about the group owner device to the to-be-connected device, and send the first password to the group owner device after the first password is shared with the to-be-connected device, so that the to-be-connected device and the group owner device more quickly complete discovery of each other and authentication configuration, which simplifies an operating procedure of connecting a new device to an established wireless device group, thereby improving connection efficiency.

The following further describes specific implementation manners of the present disclosure in detail with reference to the accompanying drawings and the embodiments. The following embodiments are used to describe the present disclosure, but are not used to limit the scope of the present disclosure.

Embodiment 1

Figure 2:
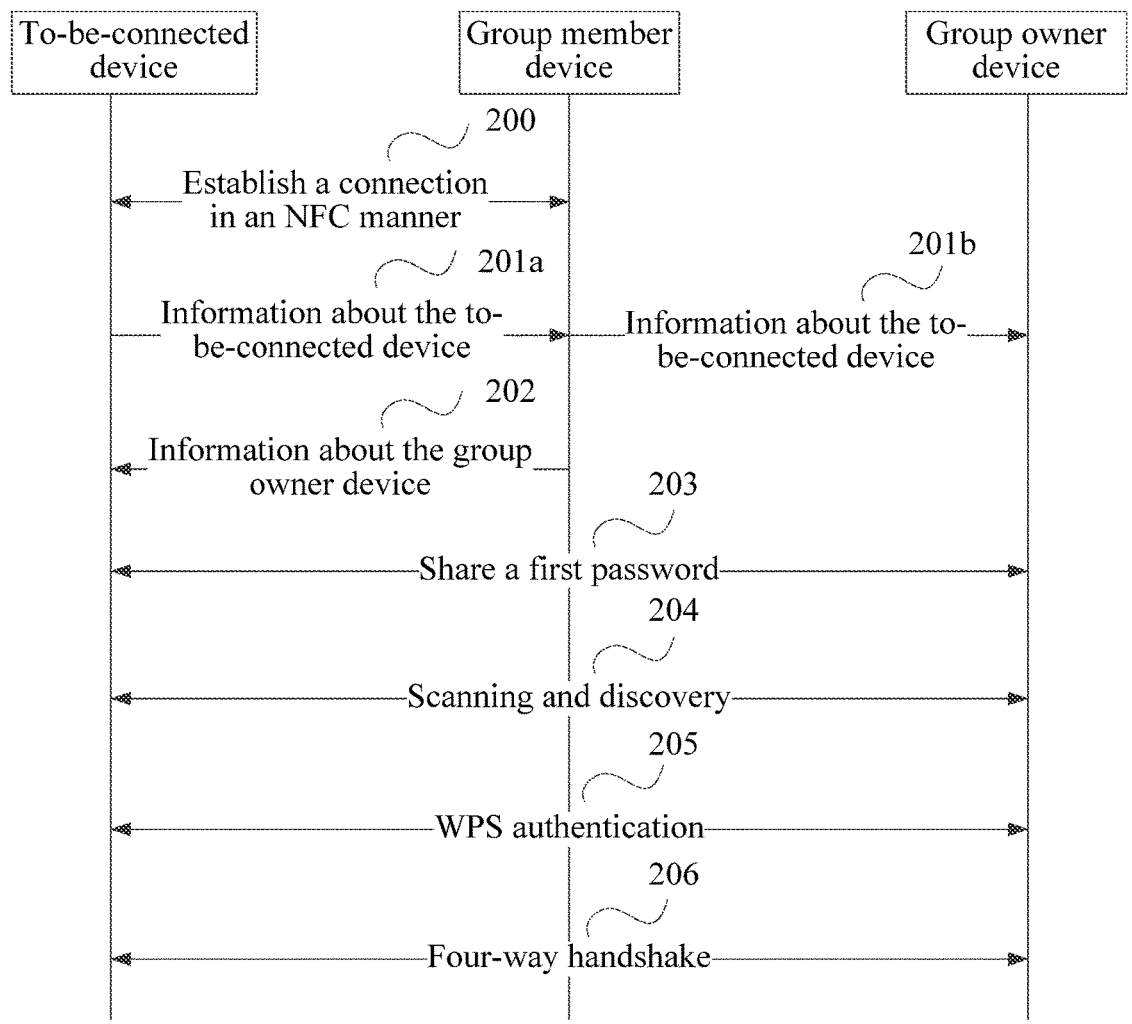
FIG. 2 is a sequence diagram of a method for establishing a connection according to Embodiment 1 of the present disclosure.

FIG. 2 is a sequence diagram of a method for establishing a connection according to Embodiment 1 of the present disclosure. In this embodiment, the group member device may communicate with the to-be-connected device in a near field communication (NFC) manner. NFC is both a short-distance communication method and a short-range high frequency wireless communications technology, and allows electronic devices to exchange data with each other (within ten centimeters) by performing non-contact point-to-point data transmission. In addition, the solution in this embodiment may also be implemented in a short-distance WiFi manner, and an implementation method of the short-distance WiFi manner is basically the same as that of the NFC manner, and is not separately described again.

Referring to FIG. 2, the method includes the following steps.

200: A group member device establishes a communication connection to a to-be-connected device in an NFC manner. An NFC card is disposed in the group member device and the to-be-connected device each, and when the group member device and the to-be-connected device come in contact within a short distance, both automatically establish a communication connection by using the respective NFC cards. After the communication connection is established, the group member device first sends role information of the group member device to the to-be-connected device, and the to-be-connected device may know, according to the role information, that the currently connected device is not a group owner device, and executes the following procedure. If the device connected to the to-be-connected device is the group owner device, an existing processing procedure is executed, which is not a key point of the present disclosure, and is not described again.

201: The group member device obtains information about the to-be-connected device and then sends the information about the to-be-connected device (which corresponds to 201*a* and 201*b* in FIG. 2) to the group owner device. The information about the to-be-connected device includes a device identifier of the to-be-connected device, for example, a hardware address, that is, a Media Access Control (MAC) address. Optionally, the information about the to-be-connected device may further include one or more of the following: an interface address, a P2P capacity parameter, an operating channel, a supported authentication manner, configuration timeout (where if configuration is not completed within a time, a configuration process becomes invalid), invitation flags, a group identification (ID) (P2P Group basic service set identification (BSSID)), a channel list, P2P device information (P2P Device Info), a configuration method, a status, a public key of a device, a public key hash value (public key hash) of a device, a WiFi simple configuration (WSC) parameter (WiFi simple configuration element (WSC IE), a P2P parameter (P2P IE), and the like.

202: The group member device transmits information about the group owner device to the to-be-connected device. The information about the group owner device includes an identifier of the group owner device, for example, a hardware address, that is, a MAC address. Optionally, the information about the group owner device may further include one or more of the following: an interface address, a P2P capacity parameter, an operating channel, a supported authentication manner, configuration timeout (where if configuration is not completed within a time, a configuration process becomes invalid), invitation flags, a group ID (P2P Group BSSID), a channel list, P2P device information, a configuration method, a status, a public key of a device, a public key hash value of a device, a WSC parameter (WSC IE), a P2P parameter (P2P IE), and the like.

203: The group member device enables the to-be-connected device and the group owner device to share a first password.

In this step, the group member device may obtain, based on the communication connection, a password of the to-be-connected device as the first password, and send the first password to the group owner device; or, based on the communication connection, the group member device uses a password shared by the group member device and the group owner device as the first password, and sends the first password to the to-be-connected device, and further optionally, the group member device may send the first password to the group owner device, where the password shared by the group member device and the group owner device may be pre-generated by the group member device and then sent to the group owner device, or may be pre-generated by the group owner device and then sent to the group member device; or, based on the communication connection, the group member device executes a process of authentication configuration on the to-be-connected device, after authentication configuration succeeds, sends credential information to the to-be-connected device, where the credential information includes a password used by the to-be-connected device and the group owner device to perform authentication (for example, WPS authentication or a four-way handshake or both), uses the password as the first password, and sends the first password to the group owner device, where when executing the process of authentication configuration on the to-be-connected device, the group member device may use a password shared by the group member device and the group owner device or another password as an initial password required by the configuration process.

Optionally, before the sending the first password to the group owner device, the method may further include the following steps: during the process of authentication configuration, the group member device generates a public key and a public key hash value of the group member device, sends the public key and the public key hash value of the group member device to the to-be-connected device, and receives a notification of a hash authentication result obtained by the to-be-connected device according to the public key and the public key hash value of the group member device, and if hash authentication succeeds, the group member device performs the step of sending the first password to the group owner device; if hash authentication fails, ends the procedure; or, the group member device receives a public key and a public key hash value of the to-be-connected device that are generated by the to-be-connected device during the process of authentication configuration, performs hash authentication according to the public key and the public key hash value of the to-be-connected device, and if hash authentication succeeds, the group member device performs the step of sending the first password to the group owner device; if hash authentication fails, ends the procedure.

204: The to-be-connected device scans for and discovers the group owner device based on the information about the group owner device, or the group owner device scans for and discovers the to-be-connected device based on the information about the to-be-connected device.

One of steps 201 and 202 may be selected to be performed, or both of steps 201 and 202 may be performed. When step 201 is selected to be performed, step 204 is the group owner device scans for and discovers the to-be-connected device based on the information about the to-be-connected device; when step 202 is selected to be performed, step 204 is the to-be-connected device scans for and discovers the group owner device based on the information about the group owner device; when both of steps 201 and 202 are performed, because the to-be-connected device and the group owner device already have the information about each other, and the to-be-connected device and the group owner device have discovered each other, step 204 may be omitted.

205: The group owner device executes a process of authentication configuration on the to-be-connected device.

The first password may be used as an initial password for executing the process of authentication configuration in this step, and after authentication configuration ends, a new password is obtained, where the new password is used for a four-way handshake in the following step 206. In addition, the first password may be directly used for the four-way handshake in the following step 206, and in this case, step 205 may be omitted.

206: The group owner device and the to-be-connected device perform a four-way handshake, and after the four-way handshake is completed, the group owner device and the to-be-connected device successfully establish a connection.

Embodiment 2

Figure 3:
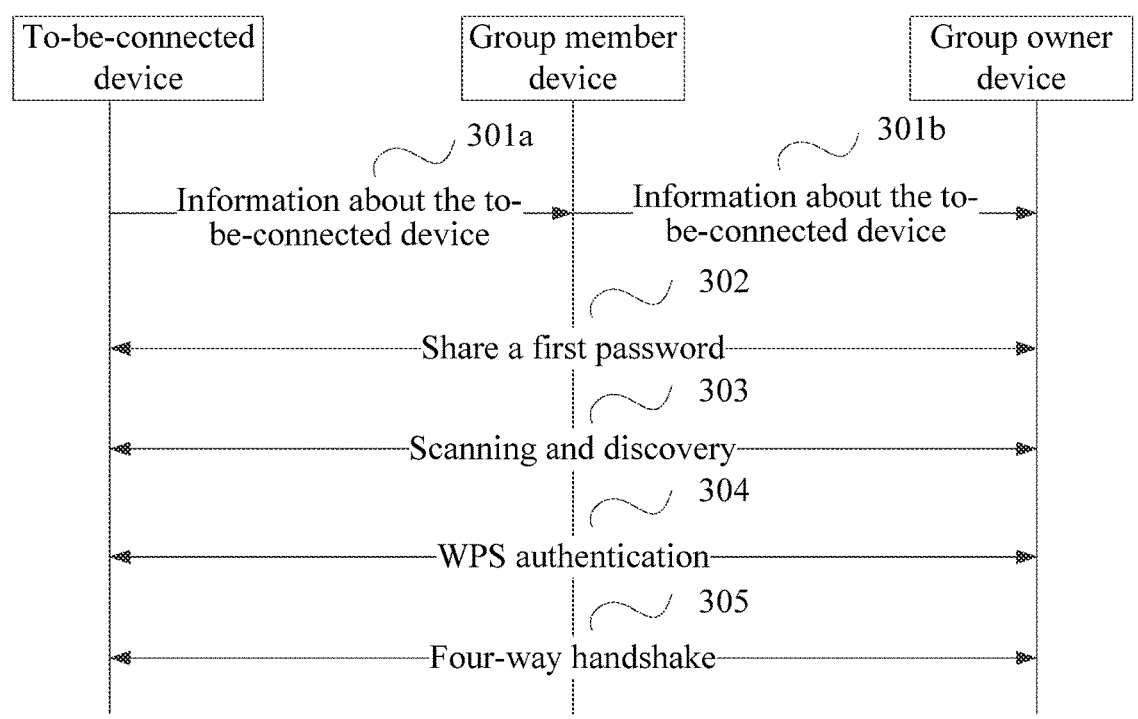
FIG. 3 is a sequence diagram of a method for establishing a connection according to Embodiment 2 of the present disclosure.

FIG. 3 is a sequence diagram of a method for establishing a connection according to Embodiment 2 of the present disclosure. A difference between this embodiment and Embodiment 1 includes a group member device communicates with a to-be-connected device by using a dynamic two-dimensional code. A two-dimensional barcode/two-dimensional code records data symbol information by using a pepper-and-salt pattern in which geometric patterns of a specific type are distributed on a plane (in a two-dimensional direction) according to a rule. In coding, a concept of "0" and "1" bit streams that constitute an internal logic basis of a computer is skillfully utilized, several geometric shapes corresponding to a binary system are used to represent text and numerical value information, and automatic information processing is implemented through automatic reading by using an image input device or an optoelectronic scanning device. The two-dimensional barcode/two-dimensional code has some commonalities with a barcode technology: each code system has a specific character set; each character occupies a width; the two-dimensional barcode/two-dimensional code has a check function, and so on. In addition, it further has a function of automatically identifying information in different lines, and a characteristic such as rotation and changes of a processed pattern.

A dynamic two-dimensional code, for example, a Quick Response (QR) code can store more data than a common barcode, has a very low requirement during scanning, and does not require linear alignment with a scanner like during scanning of a common barcode. A QR code may dynamically store in real time large-capacity content such as business card information, including WIFI ACCESS, a document, a number, a website, and the like. The QR code is increasingly applied in fields such as e-commerce, check-in, anti-counterfeiting, and the like. A form of the QR code may be quite different from a square box that is usually black and white colors and monotonous, and many interesting and lively QR two-dimensional codes may be produced.

Referring to FIG. 3, in this figure, a group member device obtains information about a to-be-connected device by scanning a dynamic two-dimensional code pre-generated by the to-be-connected device. The method includes the following steps.

301: A group member device of a wireless device group obtains information about a to-be-connected device by scanning a dynamic two-dimensional code pre-generated by the to-be-connected device, and sends the information about the to-be-connected device (which corresponds to 301*a* and 301*b* in FIG. 3) to a group owner device of the wireless device group.

The to-be-connected device pre-generates the dynamic two-dimensional code according to a user instruction, where the dynamic two-dimensional code may include the information about the to-be-connected device and a dynamic password.

302: The group member device enables the to-be-connected device and the group owner device to share a first password.

The group member device obtains a dynamic password of the to-be-connected device by scanning the dynamic two-dimensional code pre-generated by the to-be-connected device, and sends the dynamic password as the first password to the group owner device, or, the group member device executes, based on the dynamic password of the to-be-connected device, a process of authentication configuration on the to-be-connected device, after authentication configuration succeeds, sends credential information to the to-be-connected device, where the credential information includes a password used by the to-be-connected device and the group owner device to perform authentication (for example, WPS authentication and/or a four-way handshake), uses the password as the first password, and sends the first password to the group owner device.

303: The group owner device scans for and discovers the to-be-connected device.

In this step of this embodiment, the group owner device has the information about the to-be-connected device, and the to-be-connected device does not have information about the group owner device. Therefore, mainly the group owner device scans for and discovers the to-be-connected device (sends a probe response to the to-be-connected device), and finally the to-be-connected device and the group owner device discover each other.

304: The group owner device executes a process of WPS authentication configuration on the to-be-connected device.

The first password may be used as an initial password for executing the process of WPS authentication configuration in this step, and after the WPS authentication configuration ends, a new password is obtained, where the new password is used for a four-way handshake in the following step 305. In addition, the first password may be directly used for the four-way handshake in the following step 305, and in this case, step 304 may be omitted.

305: The group owner device and the to-be-connected device perform a four-way handshake.

In addition, in another embodiment of the present disclosure, when the to-be-connected device scans a dynamic two-dimensional code of the group member device, the method includes the following steps.

301': The group member device pre-generates the dynamic two-dimensional code to be scanned by the to-be-connected device, where the dynamic two-dimensional code includes the information about the group owner device and a dynamic password.

The group member device pre-generates the dynamic two-dimensional code according to a user instruction, where the dynamic two-dimensional code includes the information about the group owner device and a dynamic password of the group member device. By using this step, the group member device transmits the information about the group owner device to the to-be-connected device.

302': The group member device enables the to-be-connected device and the group owner device to share a first password.

The group member device sends the dynamic password of the group member device as the first password to the group owner device, or, the group member device executes, based on the dynamic password of the group member device, a process of WPS authentication configuration on the to-be-connected device, after WPS authentication configuration succeeds, sends credential information to the to-be-connected device, where the credential information includes a password used by the to-be-connected device and the group owner device to perform authentication (for example, WPS authentication and/or a four-way handshake), uses the password as the first password, and sends the first password to the group owner device.

303': The to-be-connected device scans for and discovers the group owner device.

In this step of this embodiment, the to-be-connected device has the information about the group owner device, but the group owner device does not have the information about the to-be-connected device. Therefore, mainly the to-be-connected device scans for and discovers the group owner device (sends a probe response to the group owner device), and finally the to-be-connected device and the group owner device discovers each other.

304': The group owner device executes a process of WPS authentication configuration on the to-be-connected device.

The first password may be used as an initial password for executing the process of WPS authentication configuration in this step, and after the WPS authentication configuration ends, a new password is obtained, where the new password is used for a four-way handshake in the following step 305'. In addition, the first password may be directly used for the four-way handshake in the following step 305', and in this case, step 304' may be omitted.

305': The group owner device and the to-be-connected device perform a four-way handshake, and after the four-way handshake is completed, the group owner device and the to-be-connected device successfully establish a connection.

Embodiment 3

Figure 4:
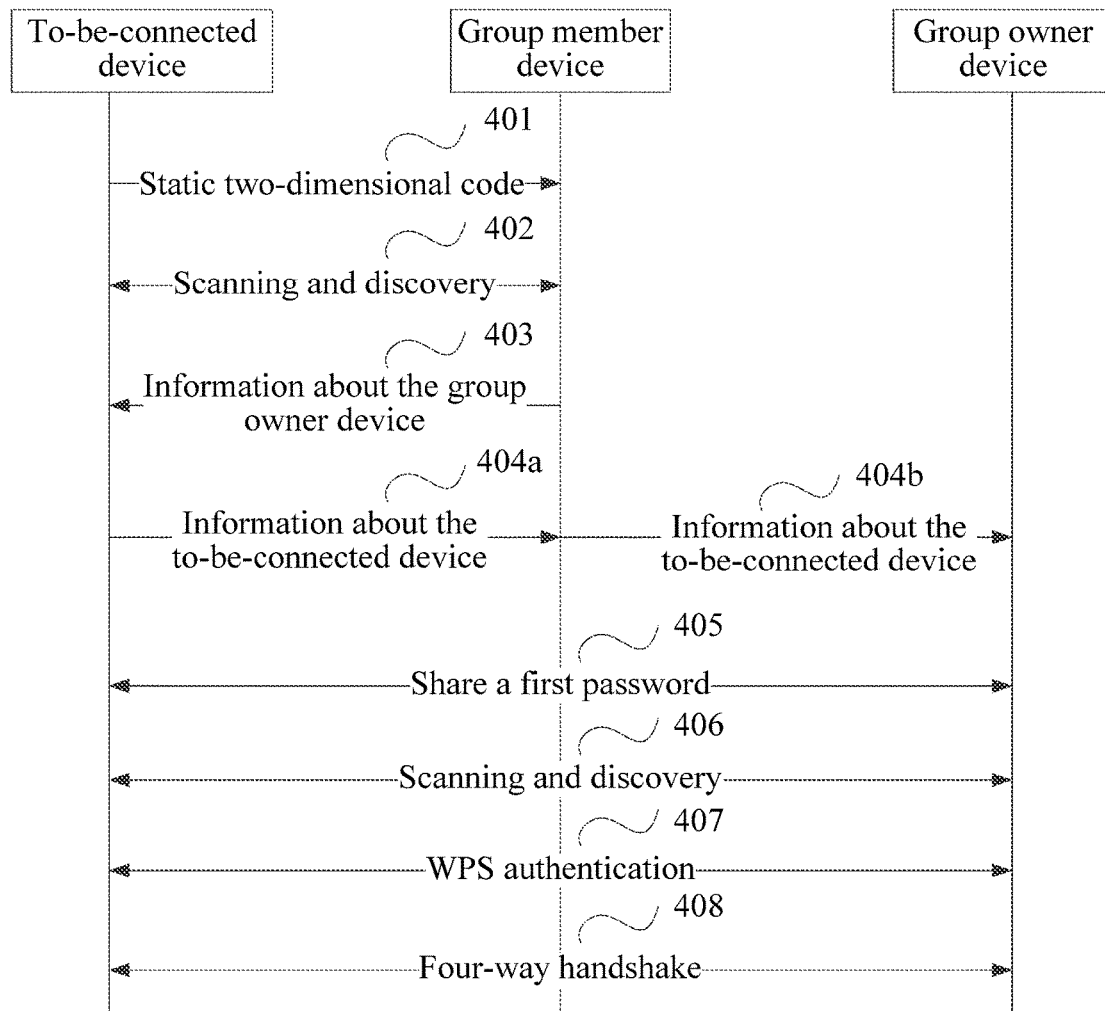
FIG. 4 is a sequence diagram of a method for establishing a connection according to Embodiment 3 of the present disclosure.

FIG. 4 is a sequence diagram of a method for establishing a connection according to Embodiment 3 of the present disclosure. A difference between this embodiment and Embodiment 1 includes a group member device establishes communication with a to-be-connected device by using a static two-dimensional code. A case in which the group member device establishes communication with the to-be-connected device by using a PIN code is basically the same as steps in this embodiment. However, the PIN code generally cannot be directly scanned, and needs to be manually input, which is not separately described again.

Referring to FIG. 4, when a group member device of a wireless device group scans a to-be-connected device, the method includes the following steps.

401: A group member device of a wireless device group scans a static two-dimensional code of a to-be-connected device. The static two-dimensional code includes a password and a hardware address, that is, a MAC address, of the to-be-connected device.

402: The group member device scans for and discovers the to-be-connected device according to information about the static two-dimensional code.

This step may also be replaced with the following manner. The group member device may also directly send the information about the static two-dimensional code to a group owner device, to enable the group owner device to scan for and discover the to-be-connected device according to the information about the static two-dimensional code, that is, perform the following step 406, so that the following steps 403, 404, and 405 may be omitted. However, when the group member device establishes communication with the to-be-connected device by using a PIN code, this step needs to be performed, and the following steps 403, 404, and 405 cannot be omitted either.

403: The group member device transmits information about the group owner device to the to-be-connected device.

404: The group member device obtains information about the to-be-connected device and then sends the information about the to-be-connected device (which corresponds to 404a and 404b in the figure) to the group owner device.

405: The group member device enables the to-be-connected device and the group owner device to share a first password.

In this step, the group member device may extract a password from the static two-dimensional code as the first password, and send the first password to the group owner device, or, the group member device executes, based on the password in the static two-dimensional code, a process of WPS authentication configuration on the to-be-connected device, after WPS authentication configuration succeeds, sends credential information to the to-be-connected device, where the credential information includes a password used by the to-be-connected device and the group owner device to perform authentication (for example, WPS authentication and/or a four-way handshake), uses the password as the first password, and sends the first password to the group owner device.

406: The to-be-connected device scans for and discovers the group owner device, or the group owner device scans for and discovers the to-be-connected device.

One of steps 403 and 404 may be selected to be performed, or both of steps 403 and 404 may be performed. When step 403 is selected to be performed, step 406 is the to-be-connected device scans for and discovers the group owner device based on the information about the group owner device; when step 404 is selected to be performed, step 406 is the group owner device scans for and discovers the to-be-connected device based on the information about the to-be-connected device; when both of steps 403 and 406 are performed, because the to-be-connected device and the group owner device already have the information about each other, step 406 may be omitted.

407: The group owner device executes a process of WPS authentication configuration on the to-be-connected device.

The first password may be used as an initial password for executing the process of WPS authentication configuration in this step, and after the WPS authentication configuration ends, a new password is obtained, where the new password is used for a four-way handshake in the following step 408. In addition, the first password may be directly used for the four-way handshake in the following step 408, and in this case, step 407 may be omitted.

408: The group owner device and the to-be-connected device perform a four-way handshake, and after the four-way handshake is completed, the group owner device and the to-be-connected device successfully establish a connection.

In another embodiment of the present disclosure, when a to-be-connected device scans for a group member device of a wireless device group, the method includes the following steps.

401': A to-be-connected device scans a static two-dimensional code of a group member device, where the static two-dimensional code includes a hardware address and a password of the group member device.

402': The to-be-connected device scans for and discovers the group member device based on information about the static two-dimensional code of the group member device.

403': After the to-be-connected device scans for and discovers the group member device, the group member device obtains information about the to-be-connected device and then sends the information about the to-be-connected device to a group owner device.

404': The group member device transmits information about the group owner device to the to-be-connected device.

405': The group member device enables the to-be-connected device and the group owner device to share a first password.

In this step, the group member device may use a password in the static two-dimensional code of the group member device as the first password, and send the first password to the group owner device, or, the group member device executes, based on the password in the static two-dimensional code of the group member device, a process of WPS authentication configuration on the to-be-connected device, after WPS authentication configuration succeeds, sends credential information to the to-be-connected device, where the credential information includes a password used by the to-be-connected device and the group owner device to perform authentication (for example, WPS authentication and/or a four-way handshake), uses the password as the first password, and sends the first password to the group owner device.

406': The to-be-connected device scans for and discovers the group owner device, or the group owner device scans for and discovers the to-be-connected device.

One of steps 403' and 404' may be selected to be performed, or both of steps 403' and 404' may be performed. When step 403' is selected to be performed, step 406' is: the group owner device scans for and discovers the to-be-connected device based on the information about the to-be-connected device; when step 404' is selected to be performed, step 406' is: the to-be-connected device scans for and discovers the group owner device based on the information about the group owner device; when both of steps 403' and 404' are performed, because the to-be-connected device and the group owner device already have the information about each other, step 406' may be omitted.

407': The group owner device executes a process of WPS authentication configuration on the to-be-connected device.

The first password may be used as an initial password for executing the process of WPS authentication configuration in this step, and after the WPS authentication configuration ends, a new password is obtained, where the new password is used for a four-way handshake in the following step 408'. In addition, the first password may be directly used for the four-way handshake in the following step 408', and in this case, step 407' may be omitted.

408': The group owner device and the to-be-connected device perform the four-way handshake, and after the four-way handshake is completed, the group owner device and the to-be-connected device successfully establish a connection.

Embodiment 4

Figure 5:
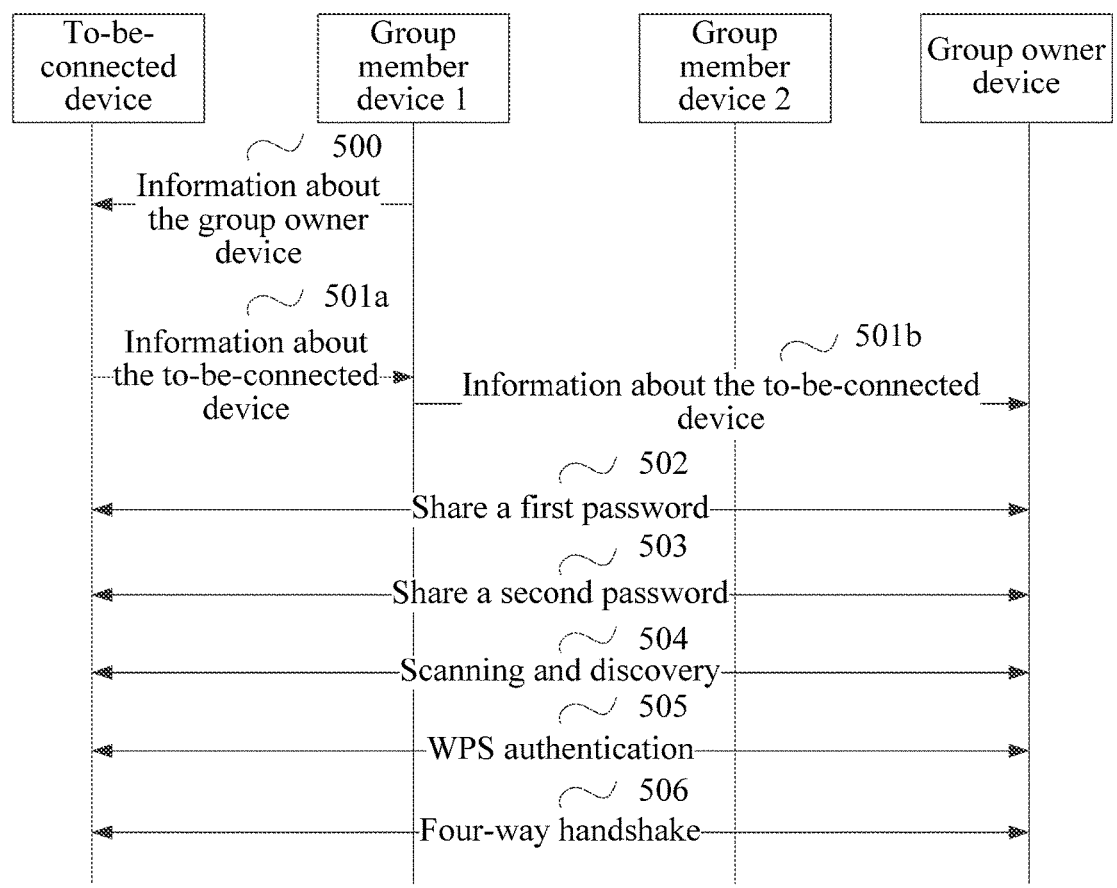
FIG. 5 is a sequence diagram of a method for establishing a connection according to Embodiment 4 of the present disclosure.

FIG. 5 is a sequence diagram of a method for establishing a connection according to Embodiment 4 of the present disclosure. A difference between this embodiment and Embodiment 1 includes a to-be-connected device shares a second password with at least one another group member device, to prevent an intermediate device from learning a shared password between the to-be-connected device and a group owner device and launching an attack, thereby improving communications security.

Referring to FIG. 5, the method includes the following steps.

500: A first group member device (which corresponds to a group member device 1 in FIG. 5) transmits information about a group owner device to a to-be-connected device.

501: The first group member device obtains information about the to-be-connected device and then sends the information about the to-be-connected device (which corresponds to 501a and 501b in the figure) to the group owner device of a wireless device group.

The foregoing step 500 and step 501 may not be both performed, but at least one step is performed.

The to-be-connected device may establish a communication connection to the first group member device in an NFC/short-distance WiFi manner, and perform step 500 and/or step 501 (refer to Embodiment 1 for details). Alternatively, the first group member device transmits the information about the group owner device to the to-be-connected device by using a dynamic two-dimensional code pre-generated by the first group member device (refer to Embodiment 2 for details). Alternatively, the first group member device obtains the information about the to-be-connected device by scanning a dynamic two-dimensional code pre-generated by the to-be-connected device (refer to Embodiment 2 for details). Alternatively, after scanning a static two-dimensional code or a PIN code of the to-be-connected device, the first group member device performs scanning and discovery of the to-be-connected device, and performs step 500 and/or step 501 (refer to Embodiment 3 for details). Alternatively, after scanning a static two-dimensional code or a PIN code of the first group member device, the to-be-connected device performs scanning and discovery of the first group member device, and performs step 500 and/or step 501 (refer to Embodiment 3 for details).

502: The first group member device enables the to-be-connected device and the group owner device to share a first password.

For a specific manner in which the first group member device enables the to-be-connected device and the group owner device to share the first password, refer to the foregoing Embodiments 1 to 3.

503: A second group member device (which corresponds to a group member device 2 in FIG. 5) enables the to-be-connected device and the group owner device to share a second password.

When the second group member device communicates with the to-be-connected device in an NFC manner, the second group member device may enable the to-be-connected device and the group owner device to share the second password in a manner similar to that in step 203 of Embodiment 1; when the second group member device establishes communication with the to-be-connected device by using a static two-dimensional code, the second group member device may enable the to-be-connected device and the group owner device to share the second password in a manner similar to that in step 405' of Embodiment 3 after the to-be-connected device is scanned for and discovered. For a manner in which the second group member device enables the to-be-connected device and the group owner device to share the second password, refer to any manner in which the group member device enables the to-be-connected device and the group owner device to share the first password in Embodiments 1 to 3, and details are not described herein again. In addition, the second group member device may not transmit the information about the group owner device to the to-be-connected device or send the information about the to-be-connected device to the group owner device.

After the foregoing steps are performed, the to-be-connected device and the group owner device have two passwords each, that is, the first password and the second password, and a password shared by the to-be-connected device and the group owner device is generated based on the first password and the second password. For example, the first password and the second password are spliced to generate the password shared by the to-be-connected device and the group owner device, or corresponding conversion is performed on the first password and the second password by using a predetermined algorithm to obtain the password shared by the to-be-connected device and the group owner device. However, the first group member device and the second group member device only know one of the passwords, and therefore it is difficult to learn the password shared by the to-be-connected device and the group owner device, thereby improving communications security.

504: The to-be-connected device scans for and discovers the group owner device.

505: The group owner device executes a process of WPS authentication on the to-be-connected device.

The first password and the second password may be used as initial passwords for executing the process of WPS authentication configuration in this step, and after the WPS authentication configuration ends, a new password is obtained, where the new password is used for a four-way handshake in the following step 506. In addition, the first password and the second password may be directly used for the four-way handshake in the following step 506, and in this case, step 505 may be omitted.

506: The group owner device and the to-be-connected device perform a four-way handshake, and after the four-way handshake is completed, the group owner device and the to-be-connected device successfully establish a connection.

In addition, when the to-be-connected device shares more passwords with the group owner device by using more group member devices, for example, three group member devices, communications security between the to-be-connected device and the group owner device becomes higher, an implementation manner thereof is similar to that in the foregoing steps, and is not described again.

Embodiment 5

Figure 6:
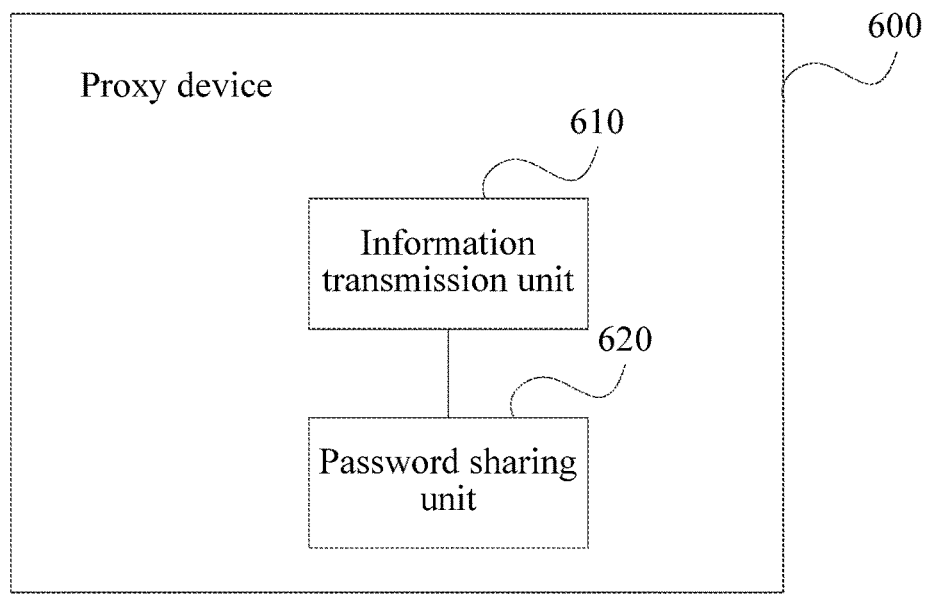
FIG. 6 is a schematic structural diagram of modules of a device for establishing a connection according to Embodiment 5 of the present disclosure.

FIG. 6 is a schematic structural diagram of modules of a device for establishing a connection according to Embodiment 5 of the present disclosure. The device in this embodiment is a group member device selected by a to-be-connected device to establish a connection to a group owner device, that is, a proxy device. As shown in FIG. 6, the proxy device 600 includes an information transmission unit 610 and a password sharing unit 620.

The information transmission unit 610 is configured to obtain information about a to-be-connected device and then send the information about the to-be-connected device to a group owner device of a wireless device group, and/or transmit information about the group owner device to the to-be-connected device, where the information about the to-be-connected device and/or the information about the group owner device is used by the to-be-connected device and the group owner device to discover each other.

The password sharing unit 620 is configured to enable the to-be-connected device and the group owner device to share a first password, where the first password is used by the to-be-connected device and the group owner device to establish a connection after the to-be-connected device and the group owner device discover each other.

Embodiment 6

This embodiment is described based on Embodiment 5.

The information transmission unit 610 is configured to establish, in a short-distance communication manner, a communication connection to the to-be-connected device, based on the communication connection, the information transmission unit obtains the information about the to-be-connected device and then sends the information about the to-be-connected device to the group owner device, and/or transmit the information about the group owner device to the to-be-connected device.

The password sharing unit 620 is configured to, based on the communication connection, obtain a password of the to-be-connected device as the first password, and send the first password to the group owner device, or, based on the communication connection, use a password shared by the password sharing unit 620 and the group owner device as the first password, and send the first password to the to-be-connected device, and further optionally, the password sharing unit 620 may send the first password to the group owner device, or, based on the communication connection, execute a process of WPS authentication configuration on the to-be-connected device, after WPS authentication configuration succeeds, send credential information to the to-be-connected device, where the credential information includes the first password, and send the first password to the group owner device.

Figure 7:
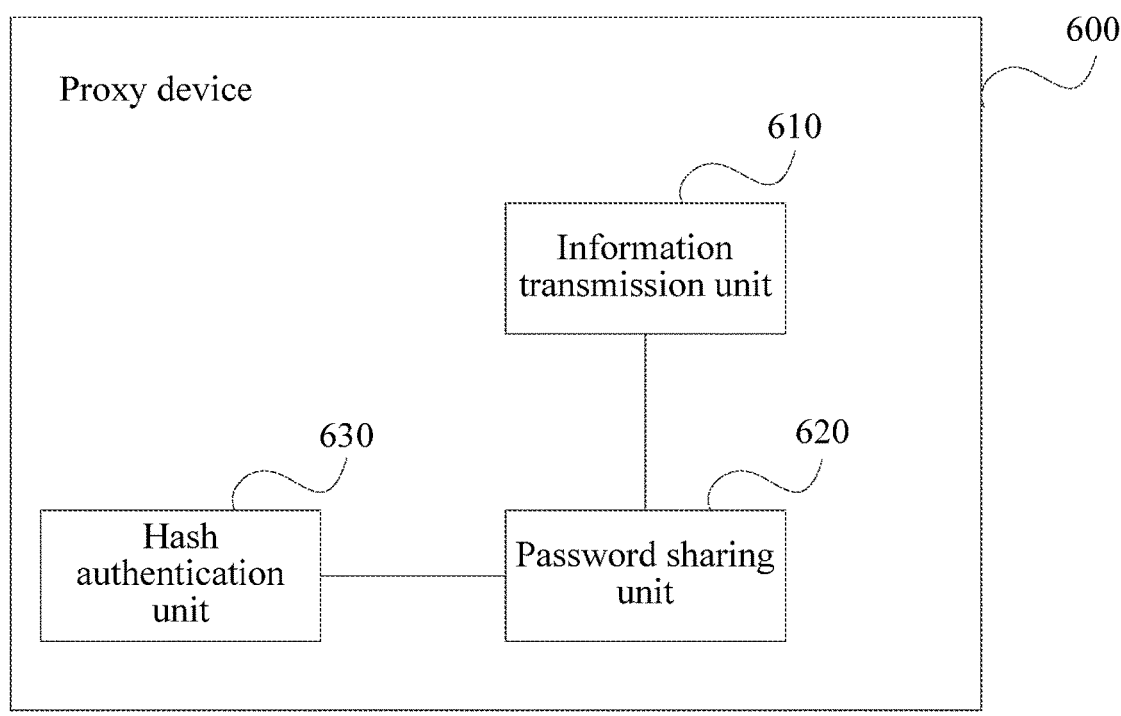
FIG. 7 is a schematic structural diagram of modules of a device for establishing a connection according to Embodiment 6 of the present disclosure.

Referring to FIG. 7, optionally, the proxy device 600 may further include a hash authentication unit 630.

The hash authentication unit 630 is configured to, during the process of WPS authentication configuration, generate a public key and a public key hash value of the group member device, send the public key and the public key hash value of the group member device to the to-be-connected device, receive a notification of a hash authentication result obtained according to the public key and the public key hash value of the group member device by the to-be-connected device, and if hash authentication succeeds, instruct the password sharing unit to send the first password to the group owner device; or, the hash authentication unit 630 is configured to receive a public key and a public key hash value of the to-be-connected device that are generated by the to-be-connected device during the process of WPS authentication configuration, perform hash authentication according to the public key and the public key hash value of the to-be-connected device, and if hash authentication succeeds, instruct the password sharing unit to send the first password to the group owner device.

Embodiment 7

This embodiment is described based on Embodiment 5.

The information transmission unit 610 is configured to obtain, by scanning a dynamic two-dimensional code pre-generated by the to-be-connected device, the information about the to-be-connected device and a dynamic password of the to-be-connected device, and send the information about the to-be-connected device to the group owner device of the wireless device group.

The password sharing unit 620 is configured to send the dynamic password as the first password to the group owner device, or, execute a process of WPS authentication configuration on the to-be-connected device based on the dynamic password, after WPS authentication configuration succeeds, send credential information to the to-be-connected device, where the credential information includes the first password, and send the first password to the group owner device.

Embodiment 8

This embodiment is described based on Embodiment 5.

The information transmission unit 610 is configured to pre-generate a dynamic two-dimensional code to be scanned by the to-be-connected device, where the dynamic two-dimensional code includes the information about the group owner device and a dynamic password, and transmit the information about the group owner device to the to-be-connected device; and the password sharing unit 620 is configured to send the dynamic password as the first password to the group owner device, or, execute, based on the dynamic password, a process of WPS authentication configuration on the to-be-connected device, after WPS authentication configuration succeeds, send credential information to the to-be-connected device, where the credential information includes the first password, and send the first password to the group owner device.

Embodiment 9

This embodiment is described based on Embodiment 5.

The information transmission unit 610 is configured to collect a static two-dimensional code or a PIN code of the to-be-connected device, scan for and discover the to-be-connected device according to information about the static two-dimensional code or the PIN code, obtain the information about the to-be-connected device and then send the information about the to-be-connected device to the group owner device, and/or transmit the information about the group owner device to the to-be-connected device.

The password sharing unit 620 is configured to extract a password from the static two-dimensional code or the PIN code as the first password, and send the first password to the group owner device, or, execute, based on the password, a process of WPS authentication configuration on the to-be-connected device, after WPS authentication configuration succeeds, send credential information to the to-be-connected device, where the credential information includes the first password, and send the first password to the group owner device.

In addition, when information is transmitted by using a static two-dimensional code, the information transmission unit 610 may be further configured to collect the static two-dimensional code of the to-be-connected device, obtain the information about the to-be-connected device from the static two-dimensional code of the to-be-connected device and then send the information about the to-be-connected device to the group owner device, so that the group owner device scans for and discovers the to-be-connected device according to information about the static two-dimensional code.

Embodiment 10

This embodiment is described based on Embodiment 5.

The information transmission unit 610 is configured to enable the to-be-connected device to scan for and discover a proxy device by collecting, by the to-be-connected device, a static two-dimensional code or a PIN code of the proxy device, and after the to-be-connected device scans for and discovers the proxy device, obtain the information about the to-be-connected device and then send the information about the to-be-connected device to the group owner device, and/or transmit the information about the group owner device to the to-be-connected device.

The password sharing unit 620 is configured to use a password in the static two-dimensional code or the PIN code as the first password, and send the first password to the group owner device, or, execute, based on the password, a process of WPS authentication configuration on the to-be-connected device, after WPS authentication configuration succeeds, send credential information to the to-be-connected device, where the credential information includes the first password, and send the first password to the group owner device.

Embodiment 11

FIG. 8 is a flowchart of a method for establishing a connection according to Embodiment 11 of the present disclosure. As shown in FIG. 8, the method is executed by a to-be-connected device, and the method includes the following steps.

810: The to-be-connected device sends information about the to-be-connected device to a group owner device of a wireless device group by using a group member device of the wireless device group, and/or the to-be-connected device obtains information about the group owner device by using the group member device, where the information about the to-be-connected device and/or the information about the group owner device is used by the to-be-connected device and the group owner device to discover each other.

The to-be-connected device sends the information about the to-be-connected device to the group owner device of the wireless device group by using the group member device of the wireless device group, and/or the to-be-connected device obtains the information about the group owner device by using the group member device. For the specific execution manner, refer to the foregoing Embodiments 1 to 4, and details are not described again.

820: The to-be-connected device shares a first password with the group owner device by using the group member device, where the first password is used by the to-be-connected device and the group owner device to establish a connection after the to-be-connected device and the group owner device discover each other.

The to-be-connected device shares the first password with the group owner device by using the group member device. For the specific execution manner, refer to the foregoing Embodiments 1 to 4, and details are not described again.

Embodiment 12

FIG. 9 is a schematic structural diagram of modules of a device for establishing a connection according to Embodiment 12 of the present disclosure. The device in this embodiment is a to-be-connected device, and as shown in FIG. 9, the to-be-connected device 900 includes a communications unit 910 and a password sharing unit 920.

The communications unit 910 is configured to send information about the communications unit 910 to a group owner device of a wireless device group by using a group member device of the wireless device group, and/or obtain information about the group owner device by using the group member device, where information about the to-be-connected device and/or the information about the group owner device is used by the to-be-connected device 900 and the group owner device to discover each other.

The password sharing unit 920 is configured to share a first password with the group owner device by using the group member device, where the first password is used by the to-be-connected device 900 and the group owner device to establish a connection after the to-be-connected device and the group owner device discover each other. The communications unit 910 may be configured to establish, in a short-distance communication manner, a communication connection to the group member device, based on the communication connection, send information about the communications unit 910 to the group owner device by using the group member device, and/or obtain the information about the group owner device by using the group member device.

The password sharing unit 920 may be further configured to, based on the communication connection, send a password of the password sharing unit 920 as the first password to the group owner device by using the group member device, or, based on the communication connection, receive a password shared by the group member device and the group owner device and sent by the group member device, and use the received password as the first password, or, based on the communication connection, execute a process of WPS authentication configuration on the group member device, and after WPS authentication configuration succeeds, receive credential information sent by the group member device, where the credential information includes the first password, where the first password is further sent by the group member device to the group owner device.

In addition, the password sharing unit 920 is further configured to share a second password with the group owner device by using at least one another group member device, where the first password and the second password are both used as passwords required by the to-be-connected device and the group owner device to execute a process of WPS authentication configuration, or, the first password and the second password are both used as passwords required by the to-be-connected device and the group owner device to execute a process of handshake communication.

Figure 10:
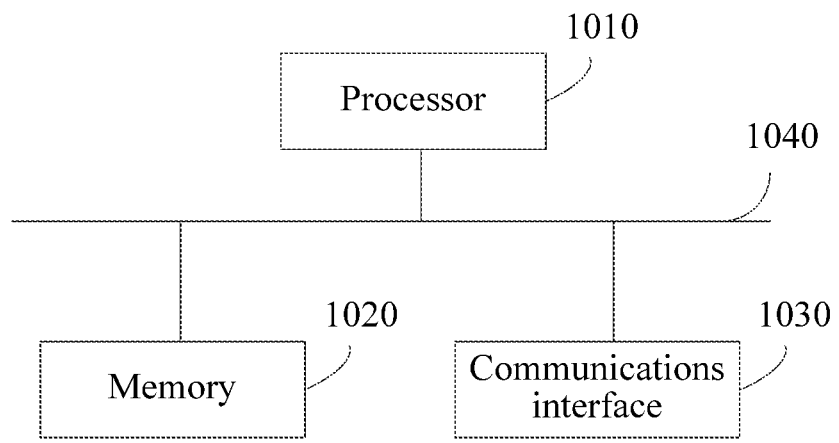
FIG. 10 is a structural diagram of a proxy device based on a computer system according to an embodiment of the present disclosure.

A proxy device for establishing a connection provided by the embodiments of the present disclosure may be implemented based on a computer system, and the methods shown in FIG. 1, FIG. 2, FIG. 3, FIG. 4, and FIG. 5 may all be implemented by the proxy device that is based on the computer system. FIG. 10 shows an embodiment of a proxy device that is implemented based on a computer system. The proxy device in this embodiment may include a processor 1010, a memory 1020, and a communications interface 1030, where the communications interface 1030 is configured to communicate with a to-be-connected device and a group owner device. The communications interface 1030 may be configured to receive information about the to-be-connected device that is sent by the to-be-connected device, send information about the group owner device to the to-be-connected device, or send the information about the to-be-connected device and the first password to the group owner device.

The memory 1020 is configured to store a program instruction, the information about the group owner device, and the like.

The processor 1010 is configured to invoke the program instruction stored in the memory 1020, and perform the steps in the foregoing method embodiments. For details, refer to the foregoing method embodiments, such as Embodiments 1, 2, 3, and 4.

The processor 1010 may be a central processing unit (CPU), an application-specific integrated circuit (ASIC), and the like. The proxy device in this embodiment may include a bus 1040. The processor 1010, the memory 1020, and the communications interface 1030 may be connected to and communicate with each other by using the bus 1040. The memory 1020 may include an entity with a storage function, such as a random access memory (RAM), a read-only memory (ROM), or a magnetic disk.

Figure 11:
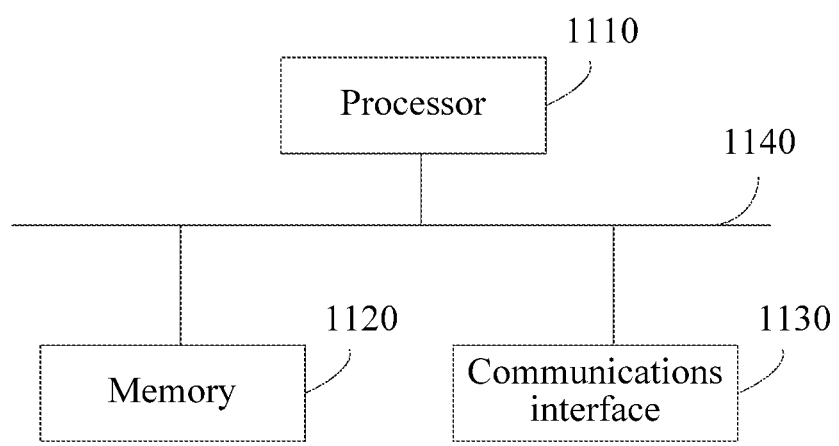
FIG. 11 is a structural diagram of a to-be-connected device based on a computer system according to an embodiment of the present disclosure.

A to-be-connected device for establishing a connection provided by the embodiments of the present disclosure may be implemented based on a computer system, and the method shown in FIG. 8 may be implemented by the to-be-connected device based on the computer system. FIG. 11 shows an embodiment of a to-be-connected device that is implemented based on a computer system. The to-be-connected device in this embodiment may include a processor 1110, a memory 1120, and a communications interface 1130, where the communications interface 1130 is configured to communicate with a group member device and a group owner device. Messages for a to-be-connected device and the group owner device to interact with the group member device (as shown in FIG. 8 of the method embodiment) are all sent and received through the communications interface 1130. The communications interface 1130 may be configured to receive information about the group owner device and a password that are sent by the group member device, or send information about the to-be-connected device to the group member device.

The memory 1120 is configured to store a program instruction.

The processor 1110 is configured to invoke the program instruction stored in the memory 1120, and perform the steps in the foregoing method embodiments. For details, refer to the foregoing method Embodiment 11.

The processor 1110 may be a CPU, an ASIC, and the like. The to-be-connected device in this embodiment may include a bus 1140. The processor 1110, the memory 1120, and the communications interface 1130 may be connected to and communicate with each other by using the bus 1140. The memory 1120 may include an entity with a storage function, such as a RAM, a ROM, or a magnetic disk.

According to the method and the device for establishing a connection in the embodiments of the present disclosure, a group member device of a wireless device group obtains information about a to-be-connected device and then sends the information about the to-be-connected device to a group owner device of the wireless device group, and/or the group member device transmits information about the group owner device to the to-be-connected device, where the information about the to-be-connected device and/or the information about the group owner device is used by the to-be-connected device and the group owner device to discover each other, and the group member device enables the to-be-connected device and the group owner device to share a first password, where the first password is used by the to-be-connected device and the group owner device to establish a connection after the to-be-connected device and the group owner device discover each other, so that the to-be-connected device and the group owner device more quickly complete a discovery and authentication process, which simplifies an operating procedure of connecting a new device to an established wireless device group, thereby improving connection efficiency.

In addition, for an existing security issue, the embodiments provided by the present disclosure include setting a key shared between the group member device and the to-be-connected device to a public key in a public and private key system, and generating, by the two parties based on the public key, a shared key, and using the shared key as the first password. If a device inside a group launches an attack, because the device inside the group can obtain only the public key, and a private key is stored by the device and not sent, an attacker cannot generate the shared key, cannot implement eavesdropping and a man-in-the-middle attack, and therefore cannot obtain privacy information between the group member device and the to-be-connected device, or attack communication between the to-be-connected device and the group owner device. Therefore, after the group member device and the to-be-connected device securely share the key, the to-be-connected device and the group owner device are securely connected to each other.

A person of ordinary skill in the art may understand that, each aspect of the present disclosure or a possible implementation manner of each aspect may be implemented as a system, a method, or a computer program product. Therefore, each aspect of the present disclosure or a possible implementation manner of each aspect may use forms of hardware only embodiments, software only embodiments (including firmware, resident software, and the like), or forms of embodiments that combine software and hardware, which are generally referred to as a "circuit", a "module", or a "system" herein. In addition, each aspect of the present disclosure or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes, but is not limited to, an electronic, magnetic, optical, electromagnetic, infrared, or semiconductor system, device, or apparatus, or any appropriate combination thereof, such as a RAM, a ROM, an erasable programmable read-only memory (EPROM or flash memory), an optical fiber, and a compact disc read-only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a computer of a user, or some may be executed as a standalone software package on a computer of a user, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in a reverse order.

Obviously, a person skilled in the art can make various modifications and variations to the present disclosure without departing from the spirit and scope of the present disclosure. The present disclosure is intended to cover these modifications and variations provided that these modifications and variations of the present disclosure fall within the scope of scope defined by the following claims of the present disclosure and their equivalent technologies.

What is claimed is:

1. A method for establishing a connection, comprising:
    establishing, by a group member device of a wireless device group, a wireless connection with a group owner device of the wireless device group;
    obtaining, by the group member device of the wireless device group via a communication connection to a to-be-connected device, information about the to-be-connected device after establishing the wireless connection with the group owner device;
    sending, by the group member device, the information about the to-be-connected device to the group owner device after obtaining the information about the to-be-connected device;
    transmitting, by the group member device, a pre-generated dynamic two-dimensional (2D) code to the to-be-connected device, wherein the pre-generated dynamic 2D code comprises information about the group owner device, and wherein the dynamic 2D code is configured to be scanned by the to-be-connected device; and
    enabling, by the group member device, the to-be-connected device and the group owner device to share a first password comprising:
        obtaining, by the group member device, a password from the dynamic 2D code, wherein the password is shared by the group member device and the group owner device as the first password based on the communication connection;
        executing, by the group member device, a process of authentication configuration on the to-be-connected device based on the communication connection;
        after the authentication configuration succeeds, sending, by the group member device, the first password to the to-be-connected device, wherein the first password is used by the to-be-connected device and the group owner device to establish a communication connection with each other after the to-be-connected device and the group owner device discover each other; and
        sending the first password to the group owner device.

2. The method of claim 1, wherein the method further comprises establishing, by the group member device in a short-distance communication manner, the communication connection to the to-be-connected device, wherein the group owner device is a central node device of the wireless device group.

3. The method of claim 1, further comprising:
    obtaining, by the group member device of the wireless device group, the information about the to-be-connected device by scanning the dynamic 2D code of the to-be-connected device; or
    collecting, by the group member device, a personal identification number (PIN) code of the to-be-connected device, scanning for and discovering, according to information about the PIN code of the to-be-connected device, and then obtaining the information about the to-be-connected device; or
    obtaining, by the group member device, the information about the to-be-connected device after the to-be-connected device obtains the dynamic 2D code comprising the information about the group owner device or a PIN code of the group member device, and after the group member device is scanned for and discovered based on the dynamic 2D code or the PIN code.

4. The method of claim 3, further comprising:
    extracting, by the group member device, a password from the dynamic 2D code comprising the information about the group owner device or the PIN code of the group member device, and sending the password as the first password to the group owner device; or
    extracting, by the group member device, the password from the dynamic 2D code or the PIN code of the to-be-connected device or the group member device, and after the authentication configuration is successful, sending credential information to the to-be-connected device, wherein the credential information comprises the first password, and sending the first password to the group owner device.

5. The method of claim 1, further comprising:
    receiving, by the to-be-connected device, a static 2D code of the group member device or a PIN code of the group member device, to permit the to-be-connected device to scan for and discover the group member device based on the static 2D code of the group member device or the PIN code of the group member device; and
    transmitting, by the group member device, the information about the group owner device to the to-be-connected device after permitting the to-be-connected device to scan for and discover the group member device.

6. The method of claim 5, wherein the dynamic 2D code comprising the information about the group owner device further comprises a dynamic password, wherein enabling the to-be-connected device and the group owner device to share a first password comprises:
    sending, by the group member device, the dynamic password as the first password to the group owner device when the dynamic password is a dynamic key generated by the group member device; or executing, based on the dynamic password, by the group member device, a process of authentication configuration on the to-be-connected device when the dynamic password is the dynamic key generated by the group member device, and after the authentication configuration is successful, sending, by the group member device, credential information to the to-be-connected device, wherein the credential information comprises the first password, and sending the first password to the group owner device; or using the dynamic password as the first password when the dynamic password is a password generated by the group owner device; or performing, by the to-be-connected device and the group owner device, the authentication configuration based on the dynamic password, to obtain a shared key as the first password when the dynamic password is the password generated by the group owner device.

7. A method for establishing a connection, comprising:

sending, by a to-be-connected device, information about the to-be-connected device to a group owner device of a wireless device group based on a communication connection by using a group member device of the wireless device group;

obtaining, by the to-be-connected device, information about the group owner device from the group member device, comprising:

establishing, by the to-be-connected device in a short-distance communication manner, a communication connection to the group member device;

receiving, by the to-be-connected device, a pre-generated dynamic two-dimensional (2D) code comprising the information about the group owner device from the group member device;

scanning, by the to-be-connected device, the dynamic 2D code comprising the information about the group owner device after receiving the dynamic 2D code comprising the information about the group owner device; and sharing, by the to-be-connected device, a first password with the group owner device by using the group member device, wherein the first password is either based on a password that is shared between the group owner device and the group member device according to the communication connection or based on credential information that is received from the group member device after a process of authentication configuration between the to-be-connected device and the group member device is successful, and wherein the first password is used by the to-be-connected device and the group owner device to establish a connection with the group owner device after the to-be-connected device and the group owner device discover each other.

8. The method of claim 7, wherein the method further comprises:

sending, by the to-be-connected device, the information about the to-be-connected device to the group owner device by using the group member device based on the communication connection; and obtaining, by the to-be-connected device, the information about the group owner device by using the group member device.

9. A group member device for establishing a connection, comprising:

a memory comprising instructions;
a communications interface coupled to the memory; and
a computer processor coupled to the memory, wherein the instructions cause the computer processor to be configured to:

establish a communication connection with a group owner device of a wireless device group;

obtain information about a to-be-connected device after establishing the communication connection with the group owner device;

send the information about the to-be-connected device to the group owner device of the wireless device group after obtaining the information about the to-be-connected device;

transmit a pre-generated dynamic two-dimensional (2D) code to the to-be-connected device, wherein the dynamic 2D code comprises information about the group owner device, and wherein the dynamic 2D code is configured to be scanned by the to-be-connected device;

enable the to-be-connected device and the group owner device to share a first password comprising:

obtain a password from the dynamic 2D code, wherein the password is shared between the group member device and the group owner device as the first password based on the communication connection;

execute a process of authentication configuration on the to-be-connected device based on the communication connection;

after the authentication configuration succeeds, send the first password to the to-be-connected device, wherein the first password is used by the to-be-connected device and the group owner device to establish a communication connection after the to-be-connected device and the group owner device discover each other; and send the first password to the group owner device.

10. The group member device of claim 9, wherein the instructions further cause the computer processor to be configured to:

establish, in a short-distance communication manner, a wireless connection to the to-be-connected device, based on the communication connection;

obtain the information about the to-be-connected device; and send the information about the to-be-connected device to the group owner device.

11. The group member device of claim 9, wherein the instructions further cause the computer processor to be configured to:

obtain the information about the to-be-connected device by scanning a dynamic 2D code of the to-be-connected device and then send the information about the to-be-connected device to the group owner device of the wireless device group; or collect a personal identification number (PIN) code of the to-be-connected device, scan for and discover the to-be-connected device according to information about the PIN code, obtain the information about the to-be-connected device, and send the information about the to-be-connected device to the group owner device of the wireless device group.

12. The group member device of claim 11, wherein the instructions further cause the computer processor to be configured to:

extract the password from the dynamic 2D code comprising the information about the group owner device or the PIN code of the group member device, and send the password as the first password to the group owner device; or extract the password from the 2D code comprising the information about the group owner device or the PIN code of the group member device, execute, based on the password, a process of authentication configuration on the to-be-connected device, after the authentication configuration is successful, send credential information to the to-be-connected device, the credential information comprising the first password, and send the first password to the group owner device.

13. The group member device of claim 9, wherein the instructions further cause the computer processor to be configured to:

transmit a static 2D code of the group member device or a PIN code of the group member device, and permit the to-be-connected device to scan for and discover, based on the static 2D code or the PIN code, the group member device; and after discovering the group member device, transmit the information about the group owner device to the to-be-connected device.

14. The group member device according to claim 13, wherein the dynamic 2D code comprising the information about the group owner device further comprises a dynamic password, and wherein the instructions further cause the computer processor to be configured to:

send the dynamic password as the first password to the group owner device, wherein the dynamic password is a dynamic key generated by the group member device; or execute, based on the dynamic password, a process of authentication configuration on the to-be-connected device, after the authentication configuration is successful, send credential information to the to-be-connected device, wherein the credential information comprises the first password, and send the first password to the group owner device, wherein the dynamic password is a dynamic key generated by the group member device; or use the dynamic password as the first password when the dynamic password is a password generated by the group owner device; or enable the to-be-connected device and the group owner device to perform the authentication configuration based on the dynamic password, to obtain a shared key as the first password when the dynamic password is the password generated by the group owner device.

15. A to-be-connected device for establishing a connection, comprising:

a memory comprising instructions;

a communications interface coupled to the memory; and a computer processor coupled to the memory, wherein the instructions cause the computer processor to be configured to:

send information about the to-be-connected device to a group owner device of a wireless device group by using a group member device of the wireless device group;

obtain information about the group owner device by using the group member device, comprising:

establish in a short-distance communication manner a communication connection to the group member device;

receive a pre-generated dynamic two-dimensional (2D) code comprising the information about the group owner device from the group member device; and scan the dynamic 2D code comprising the information about the group owner device after receiving the dynamic 2D code comprising the information about the group owner device; and share a first password from the group member device by using the group member device, wherein the first password is either based on a password that is shared between the group owner device and the group member device based on a communication connection or is based on credential information that is received from the group member device after a process of authentication configuration by the to-be-connected device on the group member device is successful, and wherein the first password is used by the to-be-connected device to establish a communication connection with the group owner device after the to-be-connected device and the group owner device discover each other.

16. The to-be-connected device of claim 15, wherein the instructions further cause the computer processor to be configured to:

send information about the computer processor to the group owner device by using the group member device; and obtain the information about the group owner device by using the group member device.

17. The to-be-connected device of claim 15, wherein the instructions further cause the computer processor to be configured to:

provide a dynamic 2D code of the to-be-connected device that is configured to be used the group member device of the wireless device group to obtain the information about the to-be-connected device; or provide a personal identification number (PIN) code of the to-be-connected device that is configured to be used the group member device to obtain the information about the to-be-connected device after scanning for and discovering the to-be-connected device according to information about the PIN code; or receive a second dynamic 2D code of the group member device or a second PIN code of the group member device, scan for and discover the group member device based on the second dynamic 2D code of the group member device or the second PIN code of the group member device.

18. The to-be-connected device of claim 17, wherein the instructions further cause the computer processor to be configured to:

extract the password from the dynamic 2D code comprising the information about the group owner device or the PIN code of the to-be-connected device by using the group member device, and send the password as the first password to the group owner device by using the group member device; or extract a password from the dynamic 2D code comprising the information about the group owner device or the PIN code of the to-be-connected device by using the group member device, execute, based on the password, a process of authentication configuration on the to-be-connected device by using the group member device, after the authentication configuration is successful, receive credential information from the group member device, wherein the credential information comprises the first password, and send the first password to the group owner device by using the group member device.

19. The to-be-connected device of claim 15, wherein the dynamic 2D code comprising the information about the group owner device further comprises a dynamic password, and wherein the instructions further cause the computer processor to be configured to:
   send the dynamic password as the first password to the group owner device by using the group member device when the dynamic password is a dynamic key generated by the group member device; or
   execute, based on the dynamic password, a process of authentication configuration on the to-be-connected device by using the group member device when the dynamic password is the dynamic key generated by the group member device, after the authentication configuration is successful, receive credential information from the group member device, wherein the credential information comprises the first password, and send the first password to the group owner device by using the group member device; or
   use the dynamic password as the first password when the dynamic password is a password generated by the group owner device; or
   enable the to-be-connected device and the group owner device to perform the authentication configuration based on the dynamic password, to obtain a shared key as the first password when the dynamic password is the password generated by the group owner device.

* * * * *